(12) United States Patent
Menegozzi et al.

(10) Patent No.: US 6,784,840 B2
(45) Date of Patent: Aug. 31, 2004

(54) METHOD FOR DETERMINING AZIMUTH AND ELEVATION ANGLES USING A SINGLE AXIS DIRECTION FINDING SYSTEM

(75) Inventors: Lionel N. Menegozzi, Annandale, NJ (US); Edward Van Alstine, Wyckoff, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/328,543

(22) Filed: Dec. 23, 2002

(65) Prior Publication Data

US 2004/0119640 A1 Jun. 24, 2004

(51) Int. Cl.$^7$ .............................. G01S 5/02; G01S 5/04
(52) U.S. Cl. ...................................... 342/417; 342/449
(58) Field of Search ................................ 342/430, 424, 342/417, 428, 432, 445, 449

(56) References Cited

U.S. PATENT DOCUMENTS 5,198,822 A * 3/1993 Brown ........................ 342/424
5,457,466 A * 10/1995 Rose ........................... 342/442

* cited by examiner

Primary Examiner—Gregory C. Issing
(74) Attorney, Agent, or Firm—RatnerPrestia

(57) ABSTRACT

A method of determining an azimuth and elevation of a radiation emission source using a single-axis direction finding system is provided. The method includes receiving a plurality of radiation signals at the single-axis direction finding system. The plurality of radiation signals are emitted from the radiation source, each of the plurality of radiation signals being received at one of a plurality of attitudes of the single-axis direction finding system. The method also includes measuring an angle of arrival of each of the plurality of radiation signals with respect to the single-axis direction finding system. Additionally, the method includes calculating an azimuth angle of each of the plurality of radiation signals with respect to the single-axis direction finding system using the respective measured angle of arrival. Further, the method includes calculating a respective vector corresponding to each of the azimuth angles at different elevation angles within a predetermined range. Further still, the method includes determining an elevation angle of the radiation emission source with respect to the single axis direction finding system by determining a conversion point of the vectors.

7 Claims, 17 Drawing Sheets

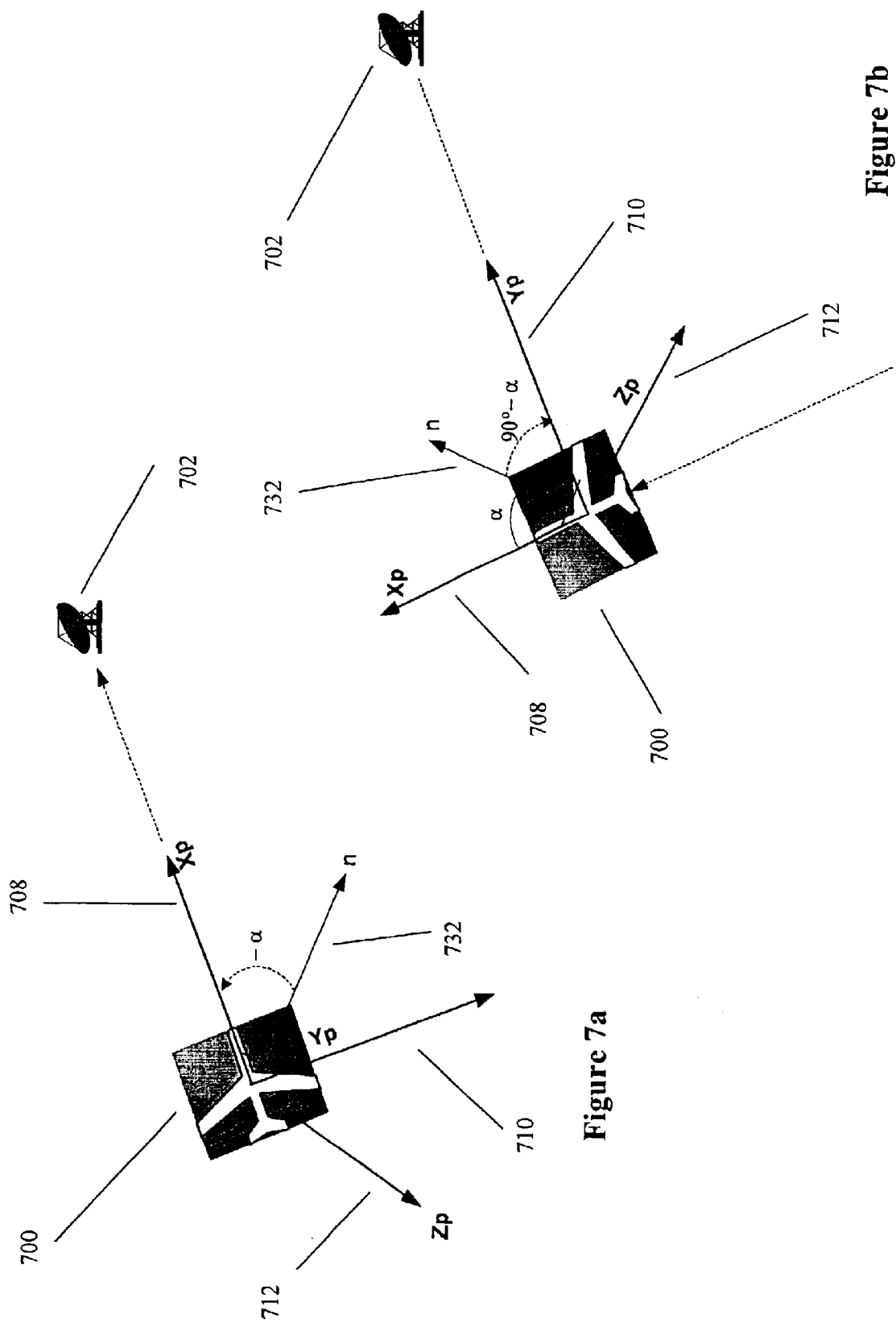

METHOD FOR DETERMINING AZIMUTH AND ELEVATION ANGLES USING A SINGLE AXIS DIRECTION FINDING SYSTEM

FIELD OF THE INVENTION

The present invention relates, in general, to a method of locating radiation emitters, and more specifically, to a method of determining azimuth and elevation angles of radiation signals from the emitter using a single-axis direction finding system.

BACKGROUND OF THE INVENTION

Airborne platforms such as airplanes and helicopters have been used for detecting the location/geolocation of emitters (e.g., a radiation emission source such as a radar transmitter). Such platforms are often equipped with Direction Finding (DF) systems that measure the angle-of-arrival (AOA) of radiation originating from the emitter.

In order to fully define a true line of bearing to the emitter, the AOA is desirably determined using two orthogonally oriented measurement devices. These orthogonally oriented measurement devices are typically two distinct AOA measurement systems that measure respective orthogonal angles associated with the airborne platform to emitter direction with respect to the platform's frame of reference.

The two orthogonal angles associated with the airborne platform to emitter direction are known as the azimuth angle and the elevation angle. The azimuth angle (az) is a horizontally measured angle associated with the direction of the airborne platform to the emitter. The azimuth angle is customarily measured with reference to magnetic north. Typically, the azimuth angle is greater than zero (az>0) when measured from north to east, and the azimuth angle is less than zero (az<0) when measured from north to west (i.e., $-180° \leq az \leq +180°$). The elevation angle (el) is a vertically measured angle associated with the emitter to airborne platform direction. The elevation angle is customarily measured from a horizontal plane.

After the azimuth and elevation angles of arrival (az and el AOAs) are measured, coordinate transformations are performed to convert the AOAs to an earth-referenced coordinate system so that the data can be used by geolocation algorithms and by other, off-board users. In order to complete the coordinate transformation, the measurement aircraft's 3-dimensional location and its angular orientation must be known. This data is usually available to a high degree of accuracy from the on-board GPS/INS (Global Positioning System/Inertial Navigation System) equipment.

This conventional method of measuring the azimuth and elevation AOAs suffers from various deficiencies. For example, the cost of a two axis system may be significant. Further, the two axis system may strain the antenna mounting and radar cross section limitations. As such, it is not always possible or desirable to install a full two-axes AOA measurement system on an aircraft.

In these cases, a single-axis AOA system may be employed. Single-axis systems are usually oriented to measure the emitter AOA with respect to the host aircraft's azimuth frame of reference. Typically, the elevation AOA is either assumed to be zero, or it is estimated based on a number of factors including the measurement aircraft's altitude. The estimate of the relative elevation angle is often somewhat inaccurate; this is particularly true when the aircraft is flying at high altitudes or when the emitter is located in an area that has significant terrain variations. If the elevation estimate is incorrect, the coordinate transformation can result in significant emitter azimuth AOA errors.

As such, it would be desirable to have an improved method of measuring the azimuth and elevation AOAs for an emitter.

SUMMARY OF THE INVENTION

In an exemplary embodiment of the present invention, a method of determining an azimuth and an elevation angle to a radiation emission source using a single-axis direction finding system is provided. The method includes receiving a plurality of radiation signals at the single-axis direction finding system. The plurality of radiation signals are emitted from the subject emitter, each of the plurality of radiation signals being received at one of a plurality of attitudes of the single-axis direction finding system. The method also includes measuring an angle of arrival of each of the plurality of radiation signals with respect to the single-axis direction finding system. Additionally, the method includes calculating an azimuth angle of each of the plurality of radiation signals with respect to the single-axis direction finding system using the respective measured angle of arrival. Further, the method includes calculating a respective vector corresponding to each of the azimuth angles at different candidate elevation angles within a predetermined range. Further still, the method includes determining the elevation angle of the radiation emission source with respect to the single axis direction finding system by determining the intersection of the vectors.

In another exemplary embodiment of the present invention, a method of determining an azimuth and an elevation angle to a radiation emission source using a single-axis direction finding system is again provided. The method includes receiving a plurality of radiation signals at the single-axis direction finding system. The plurality of radiation signals are emitted from the subject emitter, each of the plurality of radiation signals being received at one of a plurality of attitudes of the single-axis direction finding system. The method also includes measuring an angle of arrival of each of the plurality of radiation signals with respect to the single-axis direction finding system. Additionally, the method includes calculating an azimuth angle of each of the plurality of radiation signals with respect to the single-axis direction finding system using the respective measured angle of arrival. Further, the method includes calculating a rate of change of the azimuth angle with respect to the plurality of radiation signals. Further still, the method includes determining the elevation angle of the radiation emission source with respect to the single axis direction finding system using the calculated rate of change of the azimuth angle.

BRIEF DESCRIPTION OF THE DRAWINGS

The invention is best understood from the following detailed description when read in connection with the accompanying drawings. This emphasizes that according to common practice, the various features of the drawings are not drawn to scale. On the contrary, the dimensions of the various features are arbitrarily expanded or reduced for clarity. Included in the drawings are the following features:

FIG. 7A is an illustration of a radiation emission source directly ahead of an airborne platform in accordance with an exemplary embodiment of the present invention;

FIG. 7B is an illustration of a radiation emission source directly orthogonal to an airborne platform in accordance with an exemplary embodiment of the present invention;

DETAILED DESCRIPTION OF THE INVENTION

In an exemplary embodiment of the present invention, a method of determining both azimuth and elevation AOAs using a single-axis measurement system is provided. In an exemplary embodiment, this is achieved by using a series of azimuth angle-of-arrival measurements, while the measurement platform flies at various, known roll/pitch/yaw attitudes. Coordinate transformations are then performed on the series of measured azimuth AOAs, while assuming that the radiation emitter is at various elevation angles within a possible range of elevation angles. In this embodiment, the true elevation angle produces transformed AOA angles that converge in the direction of the emitter. For other relative elevation angles, the transformed AOAs do not all converge in the direction of the emitter.

Airborne platforms are normally referred to in the inertial North-East-Down (NED) set of coordinate axes. That is, the direction pointing north, the down direction pointing to the center of the earth, and the east direction being perpendicular to both the north and down axes.

Figure 1:
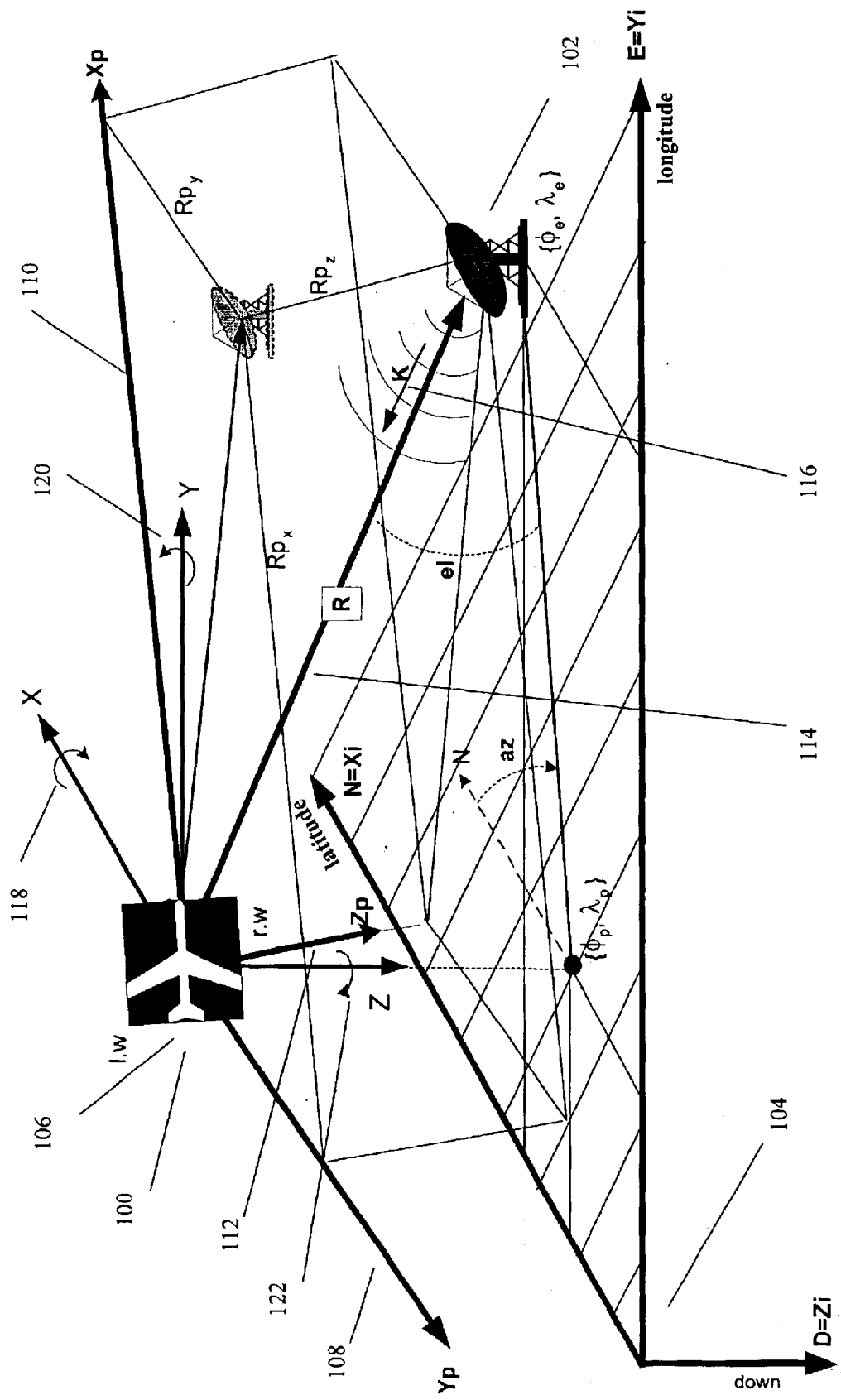
FIG. 1 is an illustration of an airborne platform receiving a signal from a radiation emission source in accordance with an exemplary embodiment of the present invention.

FIG. 1 illustrates airborne platform 100 (e.g., an airplane) including an Angle Of Arrival (AOA) measurement system for receiving a radiation signal from a ground based emitter 102. This radiation signal is illustrated using wave vector 116 (vector K) and range vector 114 (vector R), from airborne platform 100 to emitter 102.

Ground based emitter's location is shown with respect to the earth-referenced North/East/Down (NED) Inertial system 104 depicted by three orthogonal vectors N=Xi (latitude), E=Yi (longitude), and D=Zi (down). By convention, in the NED system, positive rotations are rotations in the clockwise direction when viewed toward the positive direction of the axis of rotation. Using the NED system, ground based emitter 102 is located on the surface of earth in terms of latitude and longitude at position $\{\phi_e, \lambda_e\}$, while the aircraft's longitude and latitude is represented by $\{\phi_p, \lambda_p\}$. FIG. 1 also illustrates three additional orthogonal vectors labeled $X_P$ (vector 110, tail-to-nose axis), $Y_P$ (vector 108, left wing to right wing axis) and $Z_P$ (vector 112) that define an alternate frame of reference 106 centered on airborne platform 100. Emitter 102 is shown extrapolated into frame of reference 106 ($Rp_x$, $Rp_y$, and $Rp_z$). Airborne platform attitude characteristics roll (identified with identifier 118), pitch (identified with identifier 120), and yaw (identified with identified 122) are also illustrated in FIG. 1. FIG. 1 also illustrates the azimuth (az) and elevation (el) angles from airborne platform 100 to radiation emitter 102 in the earth-referenced NED system. In an exemplary embodiment of the present invention, the direction cosines of the airborne platform axes relative to the NED axes are obtained via the aircraft navigation system (e.g., GPS/INS).

Airborne platform attitude characteristics include yaw, pitch, roll, and heading. Yaw (y) may be defined as possible angular displacement between the tail-to-nose axis and actual course line. Pitch (p) may be defined as the angular displacement between the longitudinal axis of the airborne platform and the horizontal plane, where the sign (±) depends if the nose is up or down from the horizontal plane. Roll (r) may be defined as the angular displacement between the transverse axis of the airborne platform (e.g., left wing-to-right wing) and the horizontal, where the sign is (+) for left-wing-up, right-wing-down. Heading (h) may be defined as the horizontal direction in which an airborne platform is pointed with respect to a reference, the reference often being magnetic north. Heading is usually expressed in degrees, and is positive if clockwise from the reference.

Figures 2A, 2B:
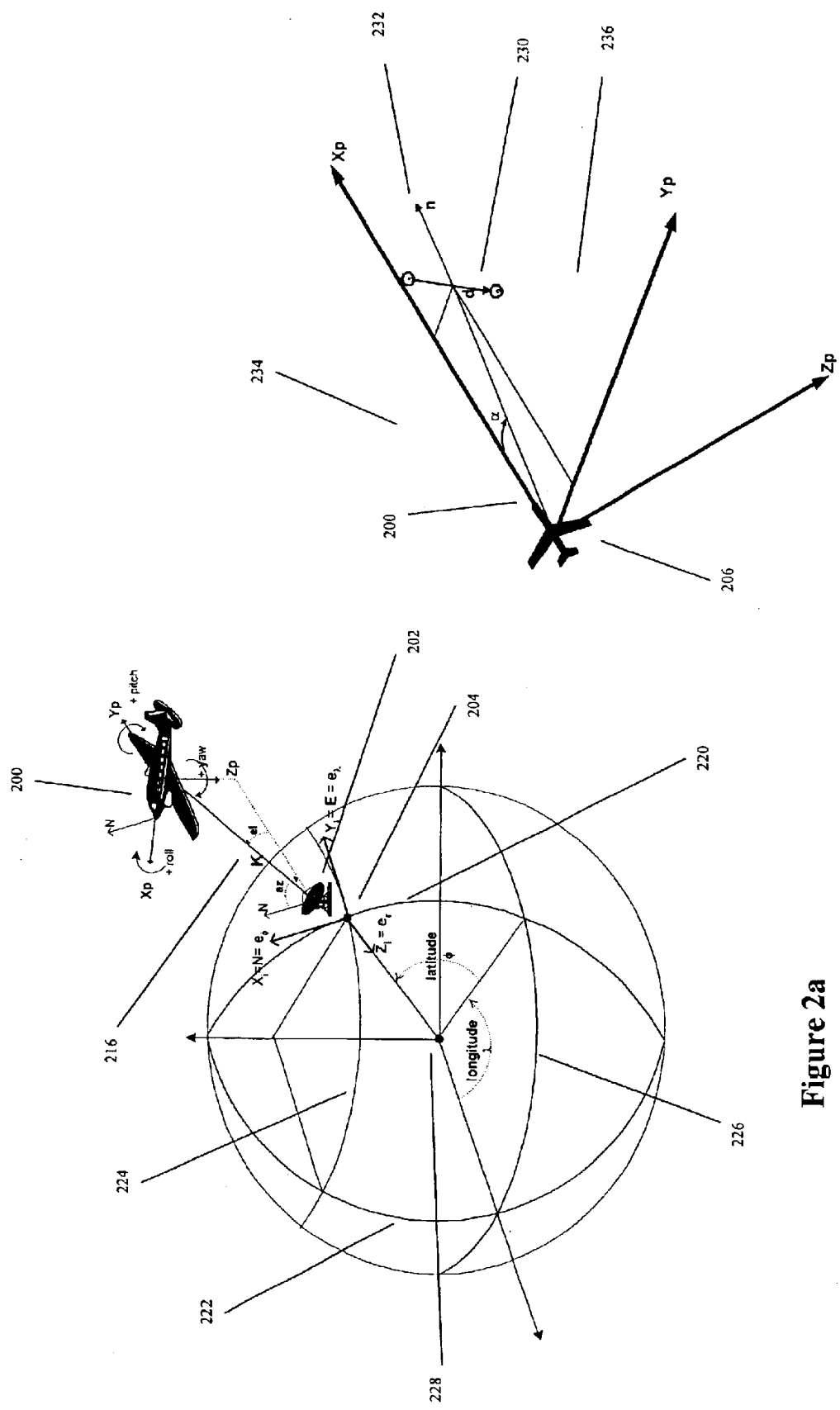
FIG. 2A is an illustration of an airborne platform receiving a signal from a radiation emission source, in relation to the World Coordinate System, in accordance with an exemplary embodiment of the present invention.
FIG. 2B is an illustration of the orientation of an interferometer on an airborne platform for receiving a radiation signal in accordance with an exemplary embodiment of the present invention.

FIG. 2a illustrates airborne platform 200, emitter 202, local inertial coordinate system 204 (earth referenced), and vector 216 (wave-vector K), in relation to the World Coordinate System 228. Meridian line 220, Greenwich meridian 222, parallel latitude 224, and equator 226 are also illustrated in FIG. 2a. FIG. 2a also illustrates the airborne platform in terms of its associated coordinate system $\{X_p, Y_p, Z_p\}$.

In an exemplary embodiment of the present invention, a passive Direction Finding (DF) system on the airborne platform includes an azimuth-only interferometer that measures the azimuthal angle-of-arrival of the emitter's radiation (i.e., the wave-vector K) with respect to the antenna axis fixed to the airborne platform. Below there is a description of the mathematical formalism for a phase interferometer DF system. The angle of arrival is obtained via the measurement of the electrical phase difference at the interferometer elements.

FIG. 2b illustrates the orientation of an interferometer antenna system (interferometer 230) on an AOA measurement airborne platform 200 (aircraft). The system of coordinates 206 associated with airborne platform 200 is also shown. The interferometer antenna system 230 includes two antenna elements (1 and 2) separated by a distance "d" as indicated in FIG. 2b. The Vector "n" (vector 232) is defined as a vector that is normal to the line that connects the two antenna elements, where "n" is at the midpoint between the two antenna elements. Angle "α" is the direction of vector "n" in the $X_p$, $Y_p$ plane with respect to the tail-to-nose axis of airborne platform 200. Vector "n" in the $X_p$, $Y_p$ plane is directed from airborne platform 200 into quadrant 236 to the right of axis $X_p$ (as opposed to quadrant 234 to the left of axis Xp). The platform axes are the tail-to-nose axis $X_p$, left-to-right wing axis $Y_p$, and the direction $Z_p$ perpendicular to both the $X_p$ and $Y_p$ directions. The measured phase difference Φ and the concomitant angle-of-arrival, θ, referent to the interferometer normal axis n (antenna axis 232), are related by equation 1a which represents the projection of the radiation wave-vector K onto the interferometer arm d (i.e., the scalar product).

$$\Phi = (K \cdot d) = (2\pi d/\lambda)\sin(\theta) \quad (1a)$$

The value associated with the scalar Φ=(K·d) is independent of the coordinate system. The implicit dependence of Φ on the airborne platform orientation (heading, pitch, and roll) is made explicit by performing the scalar operation $(K \cdot d) = \Sigma K_i d_i$, with both vectors, K and d, represented by their functional components in the same reference system, e.g., $\{X_p, Y_p, Z_p\}$, or $\{N, E, D\}$. Since phase measurements, Φ, are performed at the airborne platform, both vectors K and d will be represented by their components in the platform system of reference.

The generic components $d_i$ of vector d in the platform system are depicted in FIG. 2b, that is, $$d = \{-\sin(\alpha), \cos(\alpha), 0\} \text{ for quadrant } 236,$$

where α is the angle between the antenna axis 232 and the tail-to-nose axis of the platform ($X_p$). Similar expressions apply to the other quadrants. The generic components of K referent to the inertial system, with reference to FIG. 1, may be defined as:

$$K = -(2\pi/\lambda)\{\cos(el)\cos(az), \cos(el)\sin(az), -\sin(el)\},$$

where az is the azimuth angle with respect to North, and el is the relative elevation angle. The components $K_i$ in the platform system, are obtained by means of successive coordinate rotations applied to the inertial components of the wave vector K.

Figure 3:
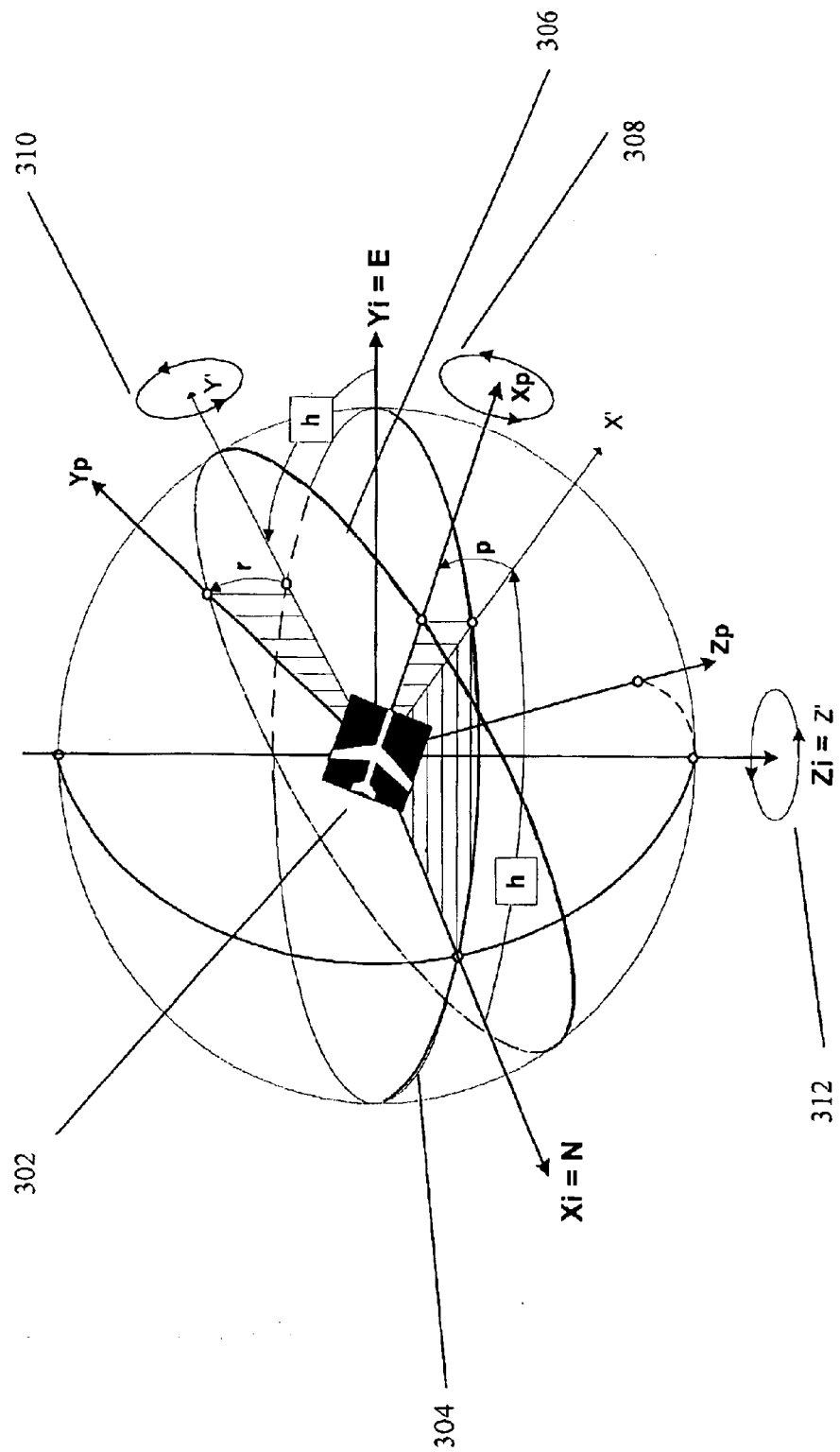
FIG. 3 is an illustration related to coordinate transformation from a airborne platform system to an inertial system in accordance with an exemplary embodiment of the present invention.

Exemplary successive coordinate rotations applied to the inertial components of the wave vector K are schematically illustrated in FIG. 3. These successive Euler rotations ($R_{yaw} \to R_{pitch} \to R_{roll}$) are utilized to achieve a generic coordinate transformation between the NED system and the platform system. FIG. 3 visually shows Euler angle rotations used to transform angles from the earth-referenced inertial frame to the aircraft platform frame 302. The horizontal ellipse 304 defined by axes $X_I$=N (North), $Y_I$=E (East), and $Z_I$ (Down) represents the earth-referenced inertial frame, where i represents the inertial coordinate system. The tilted ellipse 306 defined by axis $X_p$, $Y_p$, and $Z_p$ represents the aircraft platform 302 frame of reference, where p relates to the platform coordinate system. Rotations 308, 310, and 312 show the direction of successive Euler rotations, $R_{yaw} \to R_{pitch} \to R_{roll}$, which are used to achieve a generic coordinate transformation. The first of the successive Euler rotations is rotation 312 (about the Z' axis), also known as $R_{yaw}$, and is related to heading attitude of the airborne platform 302. Rotation 312 is positive in the North to East direction. The second of the successive Euler rotations is rotation 310 (about the Y' axis), also known as $R_{pitch}$. Rotation 310 is positive in the nose up direction. The third of the successive Euler rotations is rotation 308 (about the $X_p$ axis), also known as $R_{roll}$. Rotation 308 is positive in the right wing down direction.

The transformation between the airborne platform system and inertial systems, as illustrated in FIG. 3, may be described by the expression below:

$$\vec{K}(\text{platform Sys}) =$$

$$= \text{Rotation Matrix} \times \vec{K}(\text{Inertial Sys})$$

A 3×3 Euler Rotation Matrix, Rotation Matrix=$R_{roll} \times R_{pitch} \times R_{heading}$, used for the conversion from the NED inertial coordinates to the airborne platform-antenna axes consists of trigonometric function-elements with values that are dependent upon information provided by the airborne platform's INS (GPS aided Inertial Navigation System) and AHRS (Attitude Heading Reference Set). These data words consist of the platform heading (h), pitch (p) and roll (r) which are reported with good accuracy (e.g., $\sigma_h$, $\sigma_p$, $\sigma_r < 0.1°$) at closely spaced time intervals (e.g., 20 to 50 msec), and provide the direction-cosines of the platform axes relative to the NED axes. The INS also provides, among other quantities, the location of the airborne platform (e.g., latitude, longitudes with good accuracy.

The explicit dependence of the measured phase Φ=(K·d), and the concomitant angle-of-arrival, θ, on the airborne platform attitude, that is aircraft pitch, roll, and heading, platform to emitter azimuth, and relative elevation is shown by the expression below (1b), which considers an interferometer mounted on the quadrant II of the aircraft, as shown in FIG. 2b (quadrant II is labelled as quadrant 236 in FIG. 2b). Similar expressions with sign differences apply to the other quadrants.

$$\Phi=(2\pi d/\lambda)\sin(\theta)=(2\pi d/\lambda)\{\cos(el)\sin(az-h$$

$$-\alpha)+\sin(el)[\sin(p)\sin(\alpha)+\sin(r)\cos(p)\cos(\alpha)]$$

$$+\cos(el)[\sin(p)\sin(r)\cos(az-h)\cos(\alpha)++(1$$

$$-\cos(p))\cos(az-h)\sin(\alpha)-(1-\cos(r))\sin(az-h)$$

$$\cos(\alpha)]\} \quad (1b)$$

Figure 4:
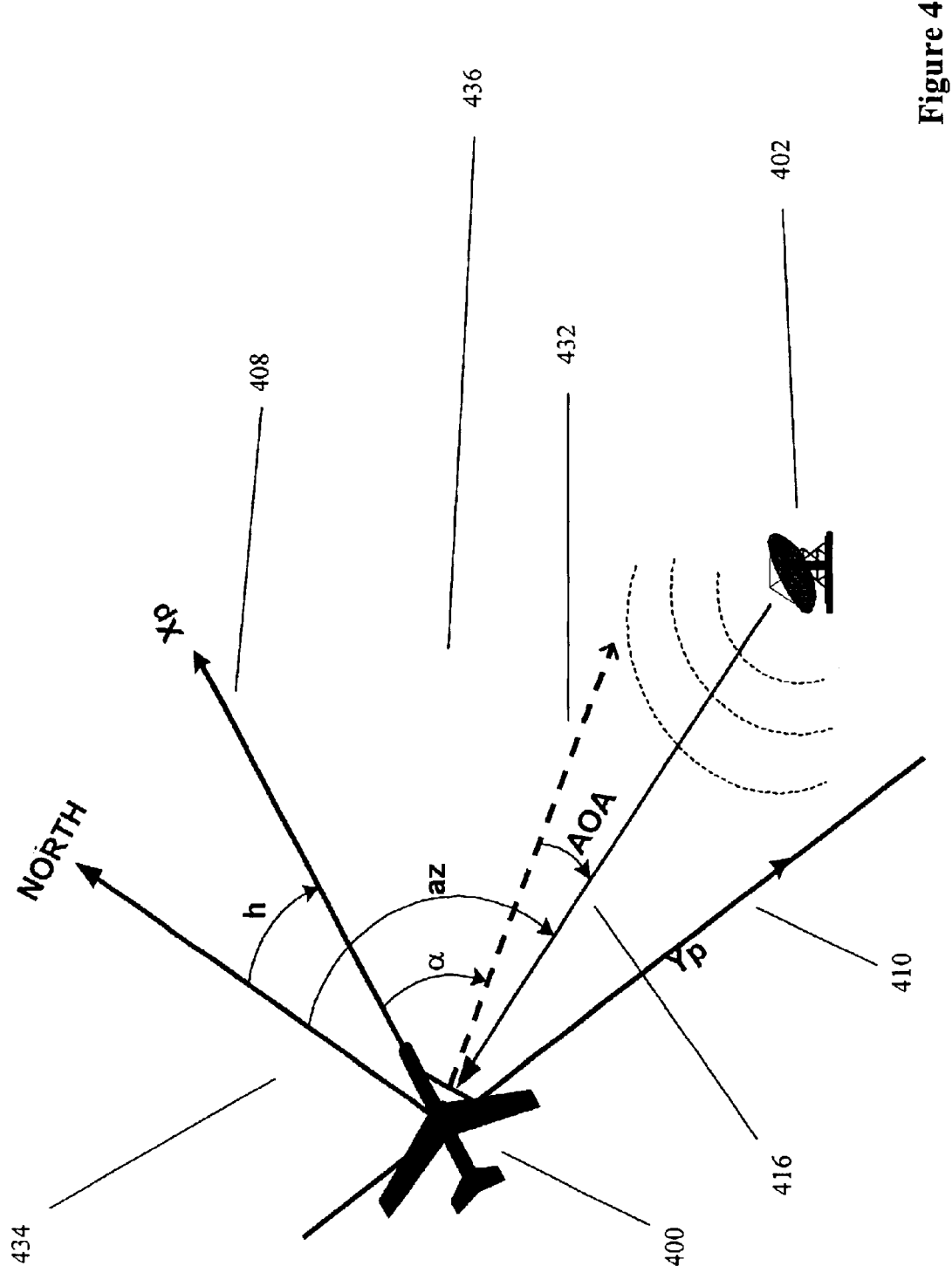
FIG. 4 is an illustration of angular relationships arising from measurment by an interferometer on an airborne platform and a radiation emission source in accordance with an exemplary embodiment of the present invention.

Expression (1b) should be examined in conjunction with the nomenclature described in FIG. 4.

FIG. 4 depicts angular relationships expressed in Equation (1b). Heading (h) is the horizontal direction in which airborne platform 400 is pointed with respect to north. The antenna orientation, α, is referenced to the platform tail-to-nose (Xp) direction, that is, along axis 408. The emitter's azimuth, az, is referenced to north. The emitter AOA (Angle-Of-Arrival) is measured with reference to the antenna axis 432. Also shown in FIG. 4 are quadrants 434 and 436, emitter 402, radiation vector 416, and left wing to right wing axis 410 (Yp).

With reference to FIG. 4, note that (az−h−α) is the azimuthal angle-of-arrival referent to antenna axis 432; while (az−h) is the angle-of-arrival referent to the tail-to-nose axis 408 of the airborne platform. Equation (1b) explicitly shows that the measured phase Φ and the associated angle-of-arrival θ contain extra contributions because of the relative elevation angle between platform and emitter (el), plus effects due to aircraft attitude [e.g., roll (r) and pitch (p)]. In the case where the elevation angle and aircraft's attitude are negligible, (r~p~el~0), the above equation shows that the measured angle-of-arrival θ coincides with the nominal AOA=(az−h−α). However, even in the absence of an aircraft attitude (r~p~0), if the relative elevation angle el ≠0, equation (1b) indicates that the measured angle-of-arrival θ differs from the nominal AOA, i.e., $$\sin(\theta)=\cos(el)\sin(az-h-\alpha), \quad (1c)$$

or $$AOA=(az-h-\alpha)=\arcsin[\sin(\theta)/\cos(el)] \quad (2a)$$

The difference between the measured $AOA_m=\theta$, and the nominal (true) AOA, due to the relative elevation angle is known as the coning error (CE). That is, $CE(AOA_m, el)=[AOA_m-\arcsin(AOA_m)/\cos(el)]$.

Figure 5:
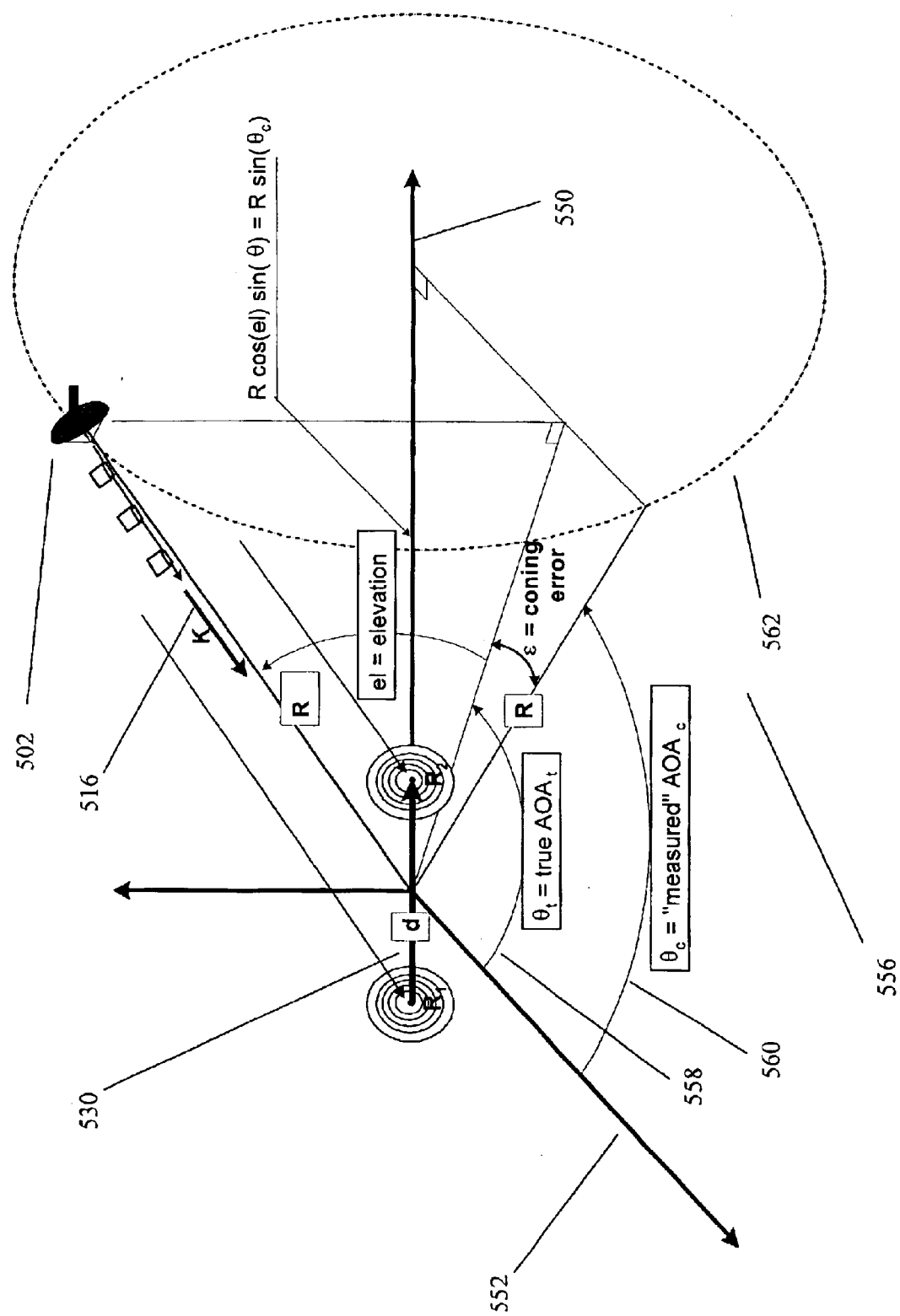
FIG. 5 is an illustration of the relationship of the measured and true angle of arrival as a function of the elevation of a radiation emission source in accordance with an exemplary embodiment of the present invention.
Figure 6:
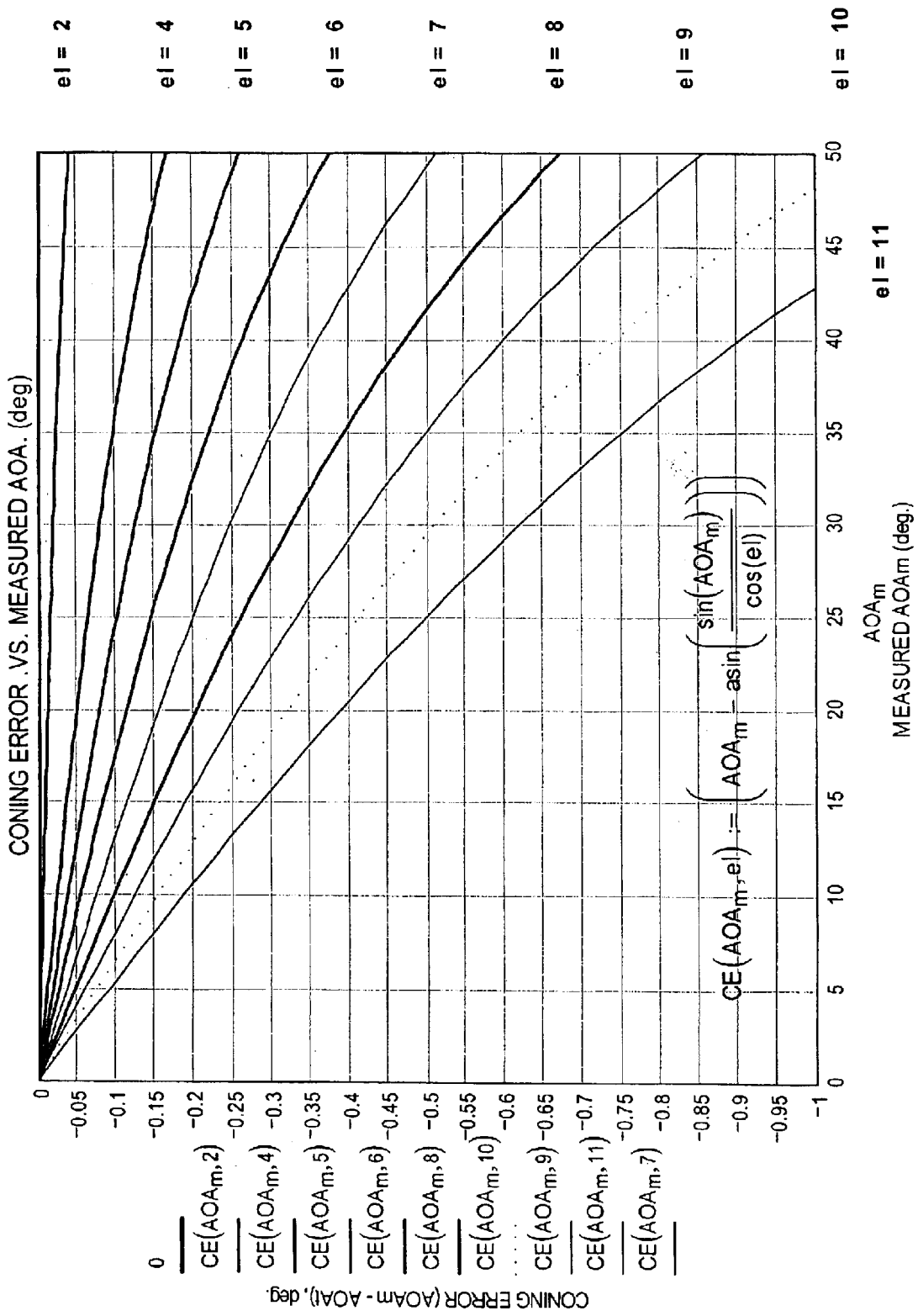
FIG. 6 is a graphical illustration of the relationship between coning error and the measured angle of arrival in accordance with an exemplary embodiment of the present invention.

FIGS. 5 and 6 are useful in understanding the concept of CE. FIG. 5 illustrates an exemplary relationship between the measured AOA ($AOA_c$) and the true AOA ($AOA_t$) as a function of emitter elevation. This exemplary diagram is useful for azimuth only DF systems. FIG. 5 illustrates arm 530(d) spanning between two antenna elements receiving radiation energy from emitter 502 along vector 516 (vector K). The vector location of each of the antenna elements is different from one another ($R_1$ and $R_2$).

In an arrangement such as that illustrated in FIG. 5, electrical phase difference may be measured as:

$$\Phi=(2\pi d/\lambda)\cos(el)\sin(\theta_t)=(2\pi d/\lambda)\sin(\theta_c)$$

Further, the magnitude of wave vector K in such an arrangement may be defined as (K=2π/λ). The signal at element R1 may be defined as $$V_1=Re\{A\exp\{i[(K\cdot R_1)-2\pi ft+67]\}\}$$

and the signal at element R2 may be defined as:

$$V_2=Re\{A\exp\{i[(K\cdot R_2)-2\pi ft+\delta]\}\}.$$

The measured phase difference is given by:

$$\Phi=(K\cdot R_2)-(K\cdot R_1)=[K\cdot(R_2-R_1)]=(K\cdot d), \text{ the scalar product.}$$

FIG. 5 also illustrates antenna axis 552 and equiphase cone axis 550, thereby defining azimuthal plane 556. The large circle 562 represents a cone shaped locus of AOA angles that all produce the same measured phase difference. The figure shows the difference between the measured angle-of-arrival ($AOA_c$) 560, and the true angle-of-arrival ($AOA_t$) 558, which is known as coning error, ε.

FIG. 6 illustrates the numerical values of coning errors (along the vertical axis) as a function of measured AOA ($AOA_m$, along the horizontal axis) for emitters at several elevation angles (el=2, 4, 5, 6, 7, 8, 9, 10 and 11 degrees). For example, looking at the curve labeled el 11, if the emitter elevation angle (relative to the measurement platform's frame of reference) is 11 degrees, and the measured AOA ($AOA_m$) is 25 degrees (relative to the antenna axis), the coning error will be −0.5 degrees. The true AOA ($AOA_t$) can be calculated by subtracting the coning error from the measured angle, $AOA_t=AOA_m$−Coning Error, or, $AOA_t=$ 25−(−0.5)=25.5 degrees. For the conditions given in this example a single-axis AOA measurement system would indicate that the azimuth AOA is 25 degrees (with an assumed elevation angle of 0 degrees) whereas, the true azimuth AOA is 25.5 degrees with an elevation AOA of 11 degrees.

Referring again to FIG. 6, if the emitter's azimuth is in the angular direction of the antenna broadside (AOA=0), there is no coning error (CE). The figure also shows that the magnitude of the CE increases for angles near the limits of the antenna field-of-view (FOV). Since the CE is an odd function of the θ, its sign depends on the sign of θ. Because of the symmetry of the CE, only one side of the FOV is shown in FIG. 6. Dealing with aircraft carrying azimuth-only interferometers, the coning error will normally be larger for high-flying airborne platforms than for low flying airborne platforms. The importance of correcting for CE depends on its magnitude compared with the needed azimuth (az) angle accuracy of the DF system itself. Expression (2a) also indicates that the CE is easy to correct if the relative elevation (el) is known or obtained by independent means. One object of the present invention is to describe a practical way of determining the relative elevation angle (el) for back correction of measured azimuthal angles-of-arrival.

The complex expression (1b) provided above contains many simple cases, for example, FIGS. 7a, and 7b. FIG. 7a illustrates shows an emitter 702 on the ground along the heading direction of the aircraft 700. FIG. 7b illustrates aircraft 700 with a flight path that is orthogonal to the azimuth direction of emitter 702. Both FIGS. 7a and 7b illustrate airborne platform 700 in terms of the Xp (tail to nose axis 708), Yp (left wing to right wing axis 710), and Zp (down axis 712) axes. Antenna axis 732(n) is also shown. More specifically, FIG. 7a shows emitter 702 on the ground directly ahead of aircraft 700, and as such, (az−h)=0. FIG. 7b shows an emitter 702 on the ground directly orthogonal to the tail to nose direction of airborne platform 700, and as such, (az−h)=90°. In these exemplary cases Equation (1b) adopts a much simpler form.

Again, in FIG. 7a, (az−h)=0, and AOA=−α. In this case, a negative pitch (nose-down) will clearly subtract from the coning error contributions due to the relative elevation. The opposite effect (an increased coning error) will result if the pitch is positive (nose-up).

Similarly, FIG. 7b shows a flight path orthogonal to the azimuthal direction of the emitter, that is, (az−h)=90°, and AOA=(90°−α). In this case, a positive roll (left-wing-up and right-wing-down) will subtract from a possible coning error, while the opposite will occur (an increase in coning error) if the roll is negative (left-wing-down). These particular cases are duly accounted for by Equation (1b). The entire expression (1b) is complex and extensive because it contains all mixed possibilities (attitudes+relative elevations); that is, it mathematically accounts for general coning error contributions. These general coning error contributions arise because of the combined effects due to relative elevation (el), generic aircraft attitudes (roll, pitch, and heading), all in conjunction with the DF system installation/orientation (α).

Addressing each of the variables in expression (1b), the INS system provides accurate values of the platform heading, pitch, and roll at fast repetition rates. In addition, the AOA measurement antenna installation angle (α) is also accurately known. However, the elevation angle (el) is not normally known. Hence there is, at first glance, no simple way to eliminate the spurious contribution of the elevation to the azimuth angle readings. One approach that comes to mind is to add new orthogonal baseline elements to the original azimuth-only interferometer. This inevitably leads to increases in the DF system size. Further, apart from increasing the DF system complexity and costs, a host of additional complications generally arise such as antenna radar cross-section augmentation, and system conformality with the platform skin and its location on the platform. As such, rather than a two-axes DF system, it is desirable to provide a simple and economical method for determining both the platform-to-emitter azimuth and the relative elevation.

Figure 8A:
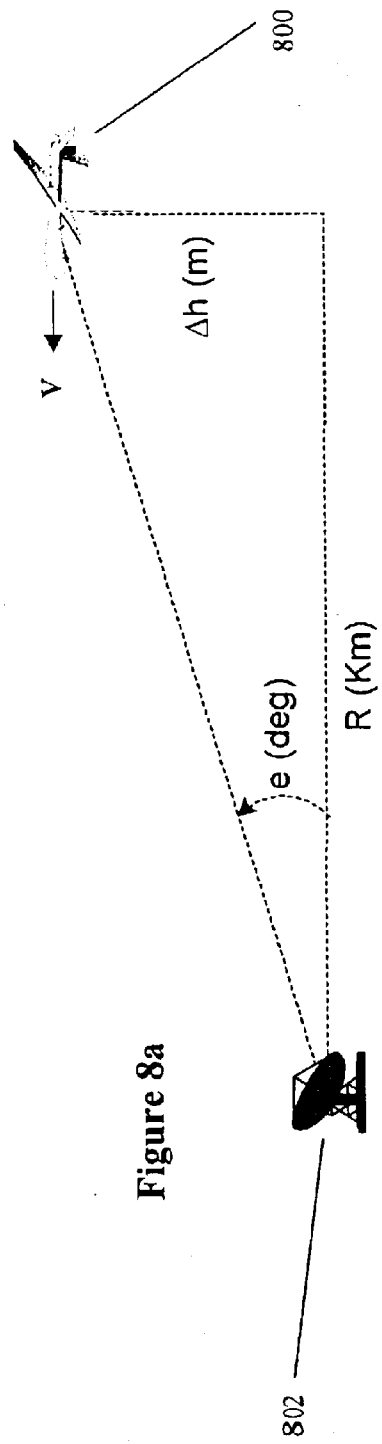
FIG. 8A is an illustration of an airborne platform in relation to a radiation emission source in accordance with an exemplary embodiment of the present invention.
Figure 8B:
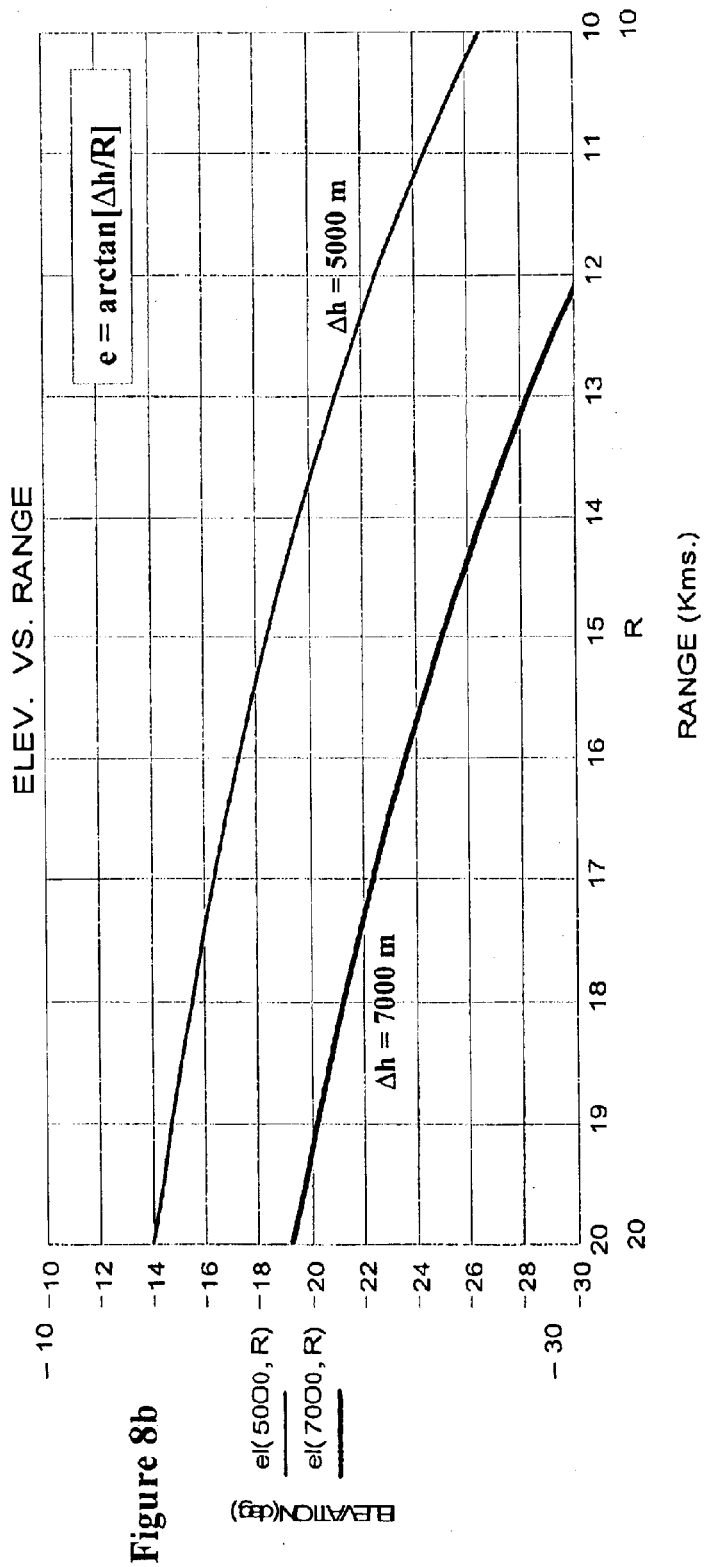
FIG. 8B is a graphical illustration of the relationship between elevation angle and the range between an airborne platform and a radiation emission source in accordance with an exemplary embodiment of the present invention.

FIG. 8a illustrates an engagement geometry between airborne platform 800 travelling at velocity V, and emitter 802, where the geometry includes Range (R), height h, and elevation angle (e). FIG. 8b is a graphical representation of the elevation angle versus the range, in a geometry such as FIG. 8a. More specifically, FIG. 8b shows how the elevation angle between the airborne measurement platform and the ground emitter varies for typical engagement geometries. For moderate speeds and for typical platform-to-emitter ranges, the elevation angle does not change much over periods of 10-to-20 seconds, d(el)/dt~0.03 deg/sec. As such, during the motion of the aircraft, a series of AOA measurements can be made at a substantially constant elevation. FIG. 8b includes two curves. The curve labeled Δh=5000 m shows how the elevation angle changes when the aircraft flies at a altitude of 5000 meters. The curve labeled Δh=7000 m shows how the elevation angle changes when the aircraft flies at an altitude of 7000 meters. For example, referring to the curve labeled Δh=5000 m, as the aircraft flies from a location that is 20 km away from the emitter to a location that is 18 km away, the elevation angle changes approximately 1.5° (from −14° to −15.5°).

In an exemplary embodiment of the present invention, a goal is to determine the emitter's nominal azimuth angle, and its elevation angle, in an earth-referenced coordinate system by using the measured angle-of-arrival, which is determined in the platform-referenced coordinate system. To achieve this, it is convenient to invert the relation (1b) as was done to get the equation (2a). Equation (1b) suggests that a simple algorithm to obtain the azimuth, or AOA=(az−h−α) should consider a couple of iterations. Indeed, the series expansions for $\sin(x)=x-x^3/3!\ldots$, and $\cos(x)=1-x^2/2!+x^4/4\ldots$, indicate that for moderate platform attitudes such that, $0 \leq r, p \leq 30°$~0.5 rad, the expression (1b) can be split into a zero-order term in r and p, and then a first order term. Further, the last two lines consist of second order terms in roll and pitch. Hence, for practical platform attitudes, the above equation (1b) can be inverted by using a few iterations such as described below.

Starting term:

$$az^{(0)} = h + \alpha + \arcsin[\sin(\theta)/\cos(el)]$$

first and second iterations, n=1, 2:

$$az^{(n)} = h + \alpha + \arcsin\{\sin(az^{(0)} - h - \alpha)$$
$$-\tan(el)[\sin(p)\sin(\alpha) + \sin(r)\cos(p)\cos(\alpha)]$$
$$-(1-\cos(p))\cos(az^{(n-1)} - h)\sin(\alpha) + (1$$
$$-\cos(r))\sin(az^{(n-1)} - h)\cos(\alpha) - \sin(p)$$
$$\sin(r)\cos(az^{(n-1)} - h)\cos(\alpha)\} \quad (2b)$$

Note that the starting term of (2b) consists of the measured angle-of-arrival, θ, corrected by the conventional coning error. The subsequent iterations (n=1, 2), introduce angle corrections for contributions due to the platform attitude and elevation-attitude coupling effects. The iteration procedure (2b) has been tested extensively. In an exemplary embodiment of the present invention, the procedure rapidly converges to retrieve the nominal (true) AOA (up to a hundredth of a degree in one or two iterations, n=1, 2) for practical aircraft attitude values (i.e., $r \leq 30°$, $p \leq 30°$).

For convenience, the azimuth value obtained at the second iteration will be designated as follows:

$$A(r, p, h, el, \theta, \alpha) \equiv az^{(2)}(r, p, h, el, \theta, \alpha) \quad (3)$$

The above iteration procedure (2b), to obtain the earth-referenced emitter's azimuth angle is based on a measured azimuthal angle-of-arrival θ, and the airborne platform attitude (heading, pitch, roll) which is available from the aircraft INS/GPS system. The azimuth value is also a function of the relative elevation angle, which is initially unknown. Hence, a method for obtaining the elevation angle (el) is discussed next.

The method of obtaining the elevation angle is based on the fact that the platform carrying the azimuth-only AOA measurement equipment can adopt different orientations while keeping the elevation relatively constant. In two different exemplary embodiments of the present invention, if several angle measurements are performed ($\geq 2$ in one embodiment, $\geq 3$ in another embodiment), the measured data, in conjunction with the INS data is sufficient for an approximate determination of the elevation angle (el). The accuracy of the elevation angle (el) will depend on the intrinsic accuracy of the AOA measurement system, the magnitude of the elevation, el, the relative geometry, the number of measurements taken, and to a lesser extent on the INS accuracy.

Figure 9:
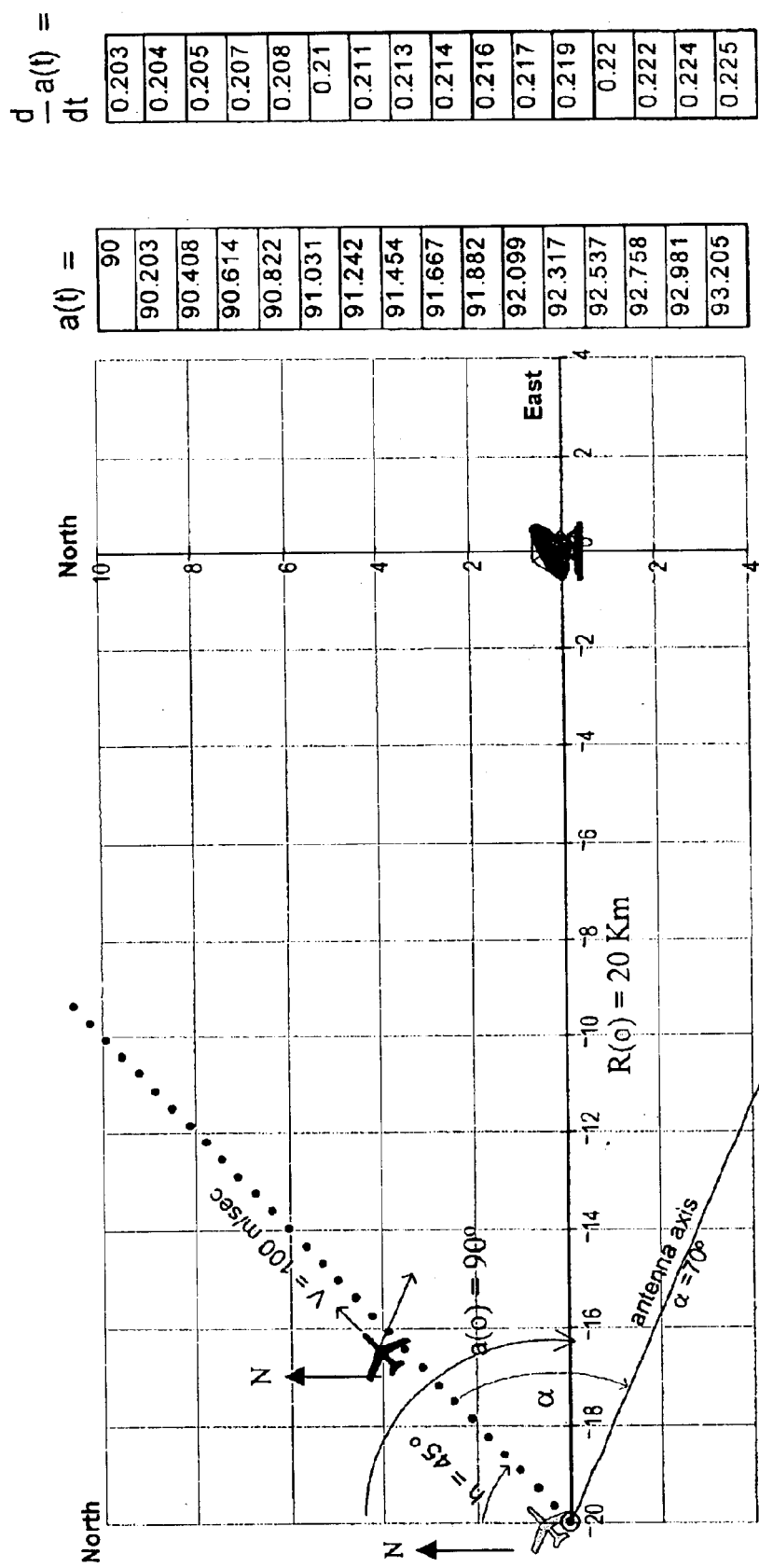
FIG. 9 is a graphical illustration of a flight path of an airborne platform in accordance with an exemplary embodiment of the present invention.

To illustrate this concept, a discussion will be provided below based on numerical data around values associated with the flight path depicted in FIG. 9. FIG. 9 shows how the angle to the emitter changes for a typical flight path. The dots along the flight path represent the location of the aircraft at five second intervals from t=0 to t=150 seconds. The two columns of numbers along the right side of the figure labeled "a(t)=" and "d/dt[a(t)]=" show the calculated azimuth angle and angular rate of change every second along the first 15 seconds of the flight path (t=0, 1, 2, 3 ... 15 seconds). The generic aircraft shown in FIG. 9 is flying at a speed of V=100 m/sec, and an initial horizontal range to the emitter of R(t=0) ~20 Km. The average heading of the aircraft is taken to be $h_o$=+45° from north, and the axis of its azimuth-only DF antenna (quadrant II) is at an angle $\alpha$=70° referent to the tail-to-nose axis of the airborne platform.

The dots shown on the flight path in FIG. 9 each stand for successive positions of the aircraft at five seconds intervals. Initially, the emitter's azimuth is az(t=0)=90°. As indicated above, the two columns of numbers on FIG. 9, stand for the values of the azimuth, and the azimuth rate-of-change at t=0, 1, 2, . . . 15 seconds. In this simple model, the successive values for the azimuth az(t), and range R(t), are obtained by noting that $R(t)=[R(0)^2+(Vt)^2-2R(0)(Vt)\cos(az(0)-h_o)]^{1/2}$, and that the rate of change of the aspect angle (az-$h_o$) is due to the normal component of the velocity vector, that is, $d[az(t)-h_o]/dt=(V/R(t))\sin[az(t)-h_o]$. As such, numerical values are obtained by integration of the above differential equation with the initial conditions shown above.

The passive anglular measurements taken with the airborne platform heading h=$h_o$ are assumed to be performed with generic pitch values p≦0 (nose-down). Angular measurements performed with platform headings h>$h_o$ are considered taken with roll attitudes r>0 (left-wing-up), and p<0 (nose-down). Angle-of-arrival (θ) measurements taken when airborne platform headings h<$h_o$ will be assumed to be taken with roll attitudes r<0 (right-wing-up), and pitch p<0 (nose-down), or p>0 (nose-up). Note that the angle-of-arrival should fall within the field-of-view of the antenna, that is, |θ|≦FOV (e.g., FOV~±55°).

Figure 10:
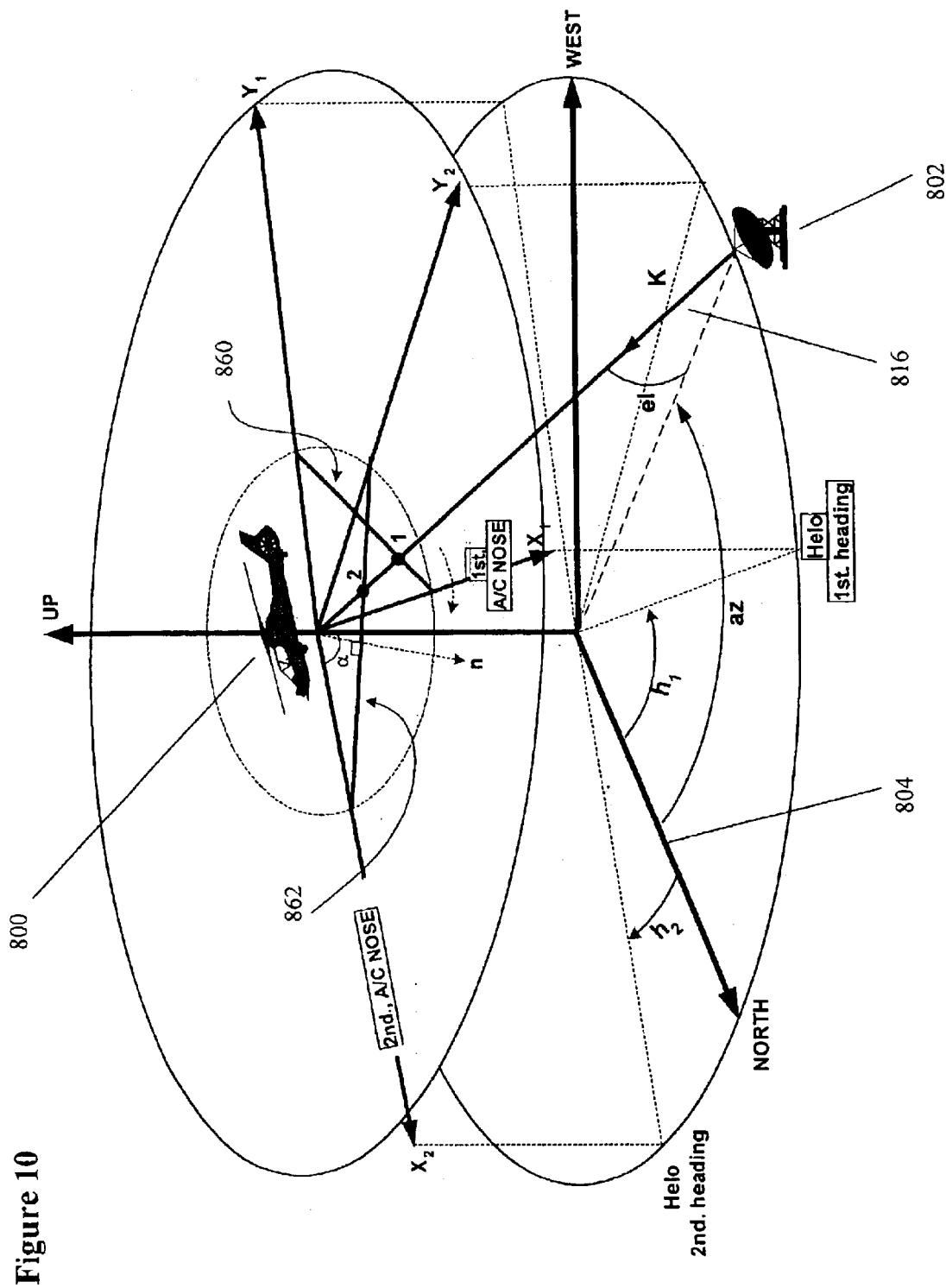
FIG. 10 is an illustration of angular measurements of an angle of arrival measurement system using a hovering airborne platform in accordance with an exemplary embodiment of the present invention.

Before discussing the general case of an aircraft flying along on a path while adopting different, generic airborne platform attitudes, it is instructive to start with the discussion of the simpler, particular case of a hovering aircraft. FIG. 10 illustrates a hovering aircraft 800 at two different headings. Aircraft 800 is shown in inertial coordinate system 804. Aircraft 800 includes an interferometer for receiving radiation from radiation vector 816 (vector K) from emitter 802). FIG. 10 pictorially shows the angular relationships associated with an AOA measurement system that is mounted on a hovering aircraft 800 (e.g., helicopter 800). The vectors labeled X1 and Y1 represent the aircraft tail to nose and left wing to right wing directions (respectively) for the first of two AOA measurements. The line labeled "1" (identified with identifier 860) represents the orientation of the interferometer for the first measurement. The vectors labeled X2 and Y2 represent the aircraft tail to nose and left wing to right wing directions (respectively) for the second AOA measurement. The line labeled "2" (identified with identifier 862) represents the orientation of the interferometer for the second measurement. The interferometer measurements ($\Delta phase_1$, and $\Delta phase_2$) are related to length of the interferometer (d), the wavelength of the emitter signal (λ), the measured aoa ($aoa_1$ and $aoa_2$ (aoa is referenced to the interferometer axis)), the elevation angle (el), the azimuth to the emitter (az (azimuth is referenced to north)), the heading of the aircraft ($h_1$ and $h_2$) and the orientation of the interferometer axis relative to the aircraft (α), as provided in the two equations provided below.

First Measurement:

$$\Delta phase_1 = (2\pi d/\lambda)\sin(aoa_1) = (2\pi d/\lambda)\cos(el)\sin[az-h_1-\alpha]$$

Second Measurement:

$$\Delta phase_2 = (2\pi d/\lambda)\sin(aoa_2) = (2\pi d/\lambda)\cos(el)\sin[az-h_2-\alpha]$$

Below are additional equations that show the azimuth to the emitter as a function of the conditions during the first and second measurements.

$$az = h_1 + \alpha + \arcsin[\sin(aoa_1)/\cos(el)]$$

$$az = h_2 + \alpha + \arcsin[\sin(aoa_2)/\cos(el)]$$

Note that in the case of the hovering aircraft, the azimuth is the same for both readings, and as such, the two equations can be combined as shown below.

$$0 = h1 - h2 + a\sin[\sin(aoa_1)/\cos(el)] - a\sin[\sin(aoa_2)/\cos(el)]$$

This equation provides the ability to obtain the relative elevation angle.

Considering a "semi-static" case, that is, the case of a hovering aircraft adopting different headings, h=$h_1$, $h_2$ . . . , with attitudes r~p~0. Consider that the hovering platform is making passive angle measurements of the incoming radiation from a stationary emitter at an azimuth, az, with respect to North. The idea is graphically depicted in FIG. 11.

Figure 11:
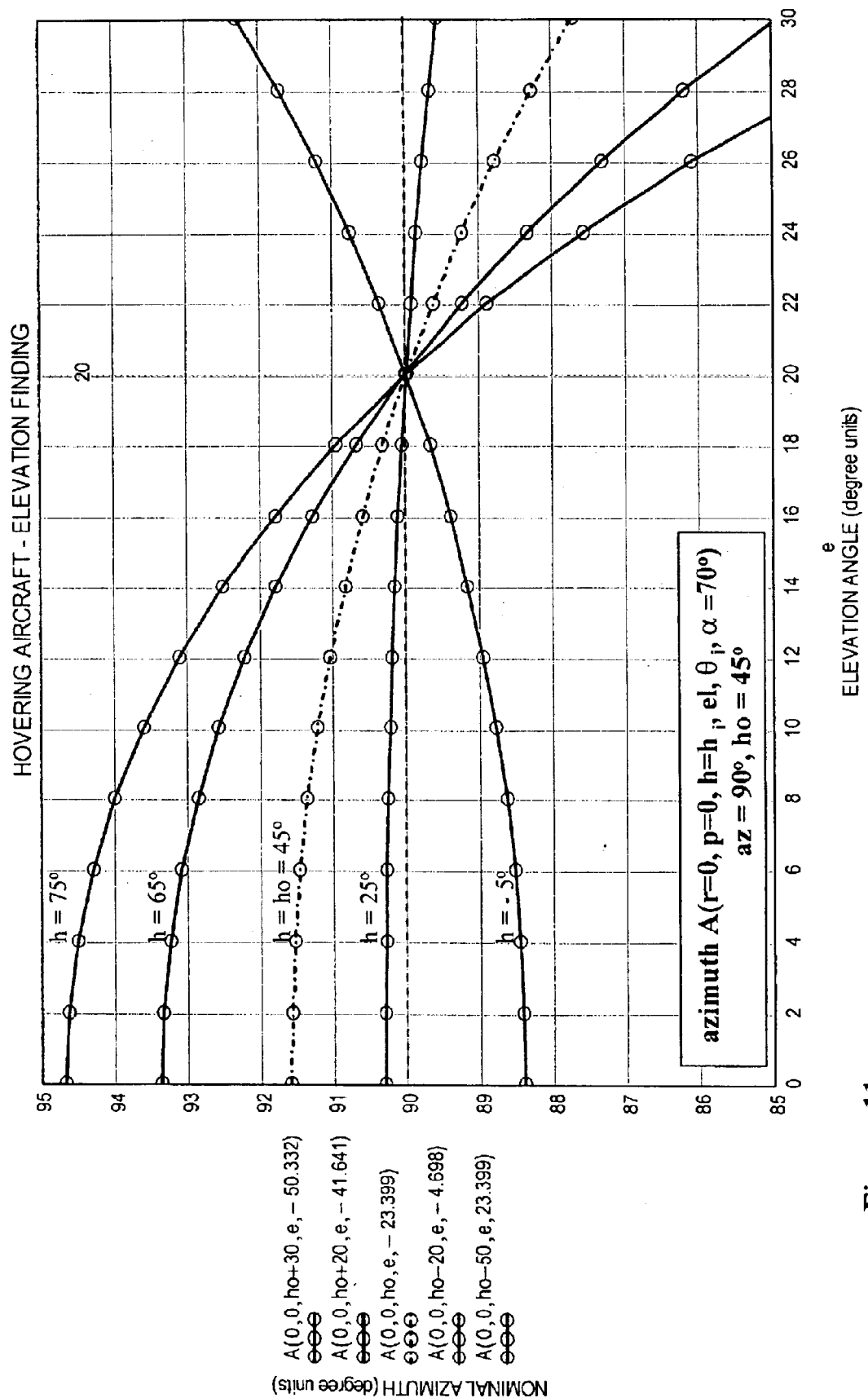
FIG. 11 is a graphical illustration of the relationship between the azimuth angle and the elevation angle of a hovering airborne platform with respect to a radiation emitter with the hovering platform oriented at a plurality of headings in accordance with an exemplary embodiment of the present invention.

FIG. 11 illustrates curves of the resultant emitter azimuth for a series of angle-of-arrival measurements at different hovering aircraft headings, plotted versus a number of possible elevation angles. The vertical axis represents the nominal (or true) azimuth angle from a measurement aircraft to an emitter (the azimuth angle is referenced to north) and the horizontal axis represents the true elevation angle from the aircraft to the emitter. FIG. 11 illustrates five curves, each curve representing a locus of azimuth/elevation points that correspond to an Angle Of Arrival (AOA) measurement taken from the hovering aircraft. The five curves correspond to AOA measurements taken with the aircraft oriented at five headings (h=75°, h=65°, h=45°, h=25° and h=-5°). The legend on the vertical axis shows aircraft orientation and AOA measurement values associated with each of the five curves. For example, the first line of the legend shows that the first AOA measurement was taken with the aircraft roll=0, pitch=0, heading=ho+30, e (elevation) unknown, and measured AOA=-50.332°. (Note that since ho=45°, heading=45+30=75°, hence the first curve is labeled h=75°). The curve labeled h=75° shows the locus of azimuth and elevation angles that would result in an AOA measurement of -50.332°. Similarly the other four curves show the locus of azimuth and elevation angles that would result in the other four AOA measurements shown in the vertical axis legend. The figure shows that the five curves intersect at a single point. This point represents the true azimuth and elevation to the emitter, azimuth=90° and elevation=20°.

The process of obtaining the results shown in FIG. 11 are now described in greater detail. Several measurements of the angle-of-arrival provide values θ=$aoa_1$, $aoa_2$, . . . given by equation (1b), or its simplified form (1c). Assuming that the hovering aircraft is at the first position shown in FIG. 9, that is, az=a(0)=90° (tbd), ho=45°, α=70°, and consider five measurements of the angle-of-arrival as shown below. These values represent the measured angle-of-arrival that would be reported by an ideal single-axis measurement system installed on an aircraft that is at a height that results in a 20° elevation look-down angle to the emitter. The format of these five measurements, as well as the values themselves, are reproduced below.

$\theta = \theta(r, p, h, el, az, \alpha)$ $$(4) \begin{cases} \theta(0, 0, ho, 20, 90, \alpha) = -23.399° \\ \theta(0, 0, ho + 20, 20, 90, \alpha) = -41.641° \\ \theta(0, 0, ho + 30, 20, 90, \alpha) = -50.332° \\ \theta(0, 0, ho - 20, 20, 90, \alpha) = -4.698° \\ \theta(0, 0, ho - 50, 20, 90, \alpha) = +23.399° \end{cases}$$

Next, the above measured angles $\theta = \theta_1, \theta_2, \ldots \theta_5$, in conjunction with the aircraft attitude $h=h_1, h_2, \ldots h_5$, may be substituted into the azimuth determining equation (2a), or (2b) and (3). However, since the elevation angle (el) is not known, the earth-referenced azimuth, $A(r, p, h_i, el, \theta_i, \alpha)$, corresponding to each of the measured $\theta_i$ is calculated for different values of the elevation angles within a plausible range el=$el_1$, $el_2$, $el_3$, ... $el_n$. The final result of this procedure causes the earth-referenced azimuths to converge into a unique elevation. This is graphicallly depicted in FIG. 11. As stated above, each of the curves intercept at the desired relative elevation value el=20°. in an exemplary embodiment of the present invention, this step would be accomplished by an algorithm searching within some tolerance for a commonly valued component among a set of vectors.

The arrangement illustrated in FIG. 10 may give rise to a brief mathematical procedure applicable for a pair of measurements of the type described. That is, $A(0,0,h_1\theta_1,el,\alpha)=h_1+\alpha+\arcsin[\sin(\theta_1)/\cos(el)]$, and $A(0,0,h_2\theta_2,el,\alpha)=h_2+\alpha+\arcsin[\sin(\theta_2)/\cos(el)]$, The "intersection" of the above two curves versus the elevation (el) should provide both the elevation and azimuth values.

Note that the measurement error of the AOA has been purposely ignored. In practice, however, the measured angle of arrival ($\theta$) may contain implicit random errors, normally, characterized by a rms value $\sigma\theta$. (For interferometer systems, the angle error, $\sigma\theta$, mainly depends on arm imbalances, phase measurement errors $\sigma\Phi$, the frequency of operation, size of the interferometer arm, and angle-off antenna axis). Hence, the elevation (el) will necessarily have an associated uncertainty $\sigma el$. Qualitatively, the matter may be clarified by using the angle-of-arrival measurements (4), and by taking into account that, in practice, they are associated with an uncertainty band $\sigma\theta$, e.g., $\sigma\theta$~0.5°. For brevity, only three of the above AOAs are provided below:

$\theta = \theta(r, p, h, el, az, \alpha)$ $$(4') \begin{cases} \theta(0, 0, ho + 30, 20, 90, \alpha) = -50.332° \pm 0.5° \\ \theta(0, 0, ho, 20, 90, \alpha) = -23.399° \pm 0.5° \\ \theta(0, 0, ho - 50, 20, 90, \alpha) = +23.399° \pm 0.5° \end{cases}$$

Figure 12:
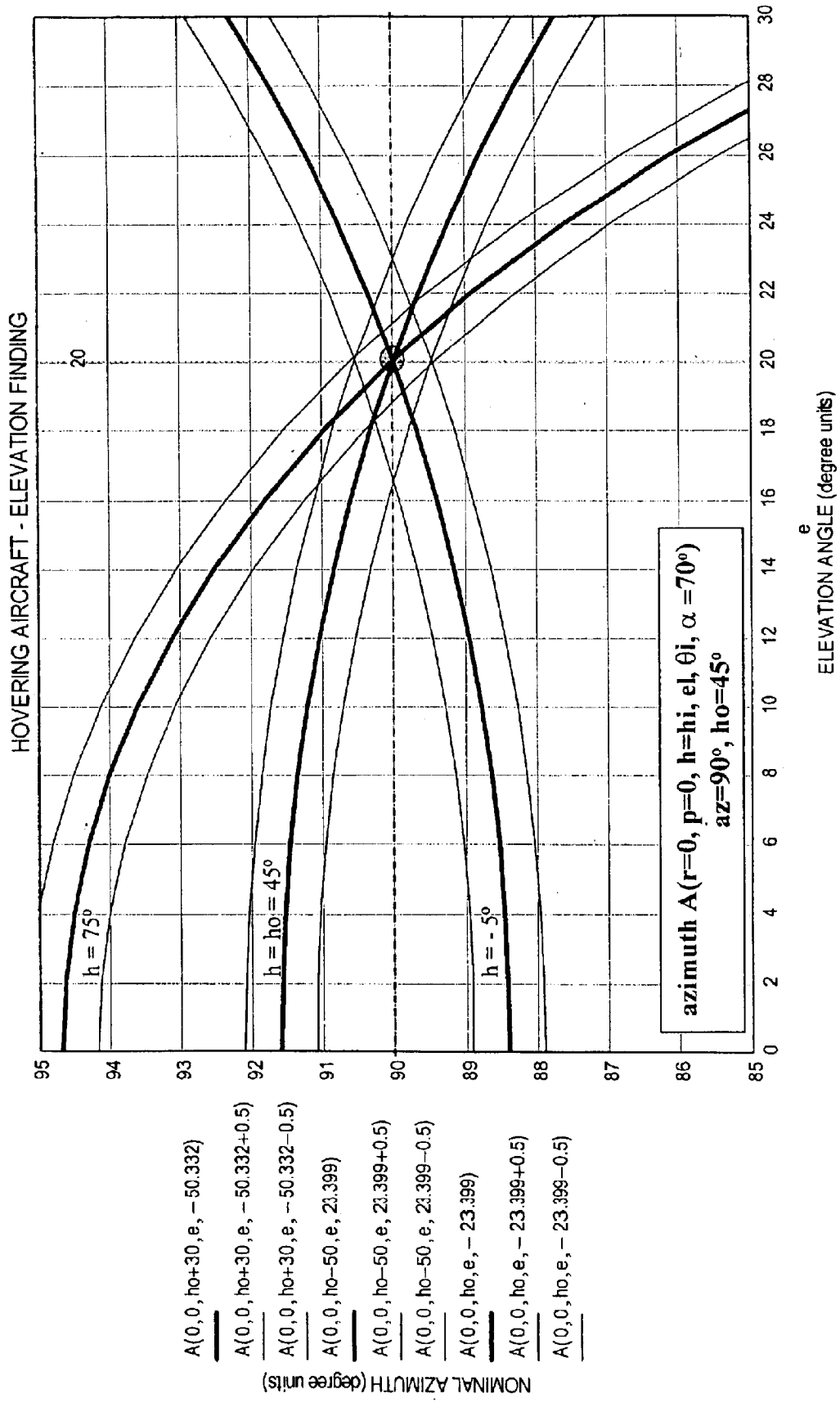
FIG. 12 is another graphical illustration of the relationship between the azimuth angle and the elevation angle of a hovering airborne platform with respect to a radiation emitter in accordance with an exemplary embodiment of the present invention.

By simple repeating the procedure described in the paragraph below expressions (4), the results illustrated in FIG. 12 are obtained. FIG. 12 is a graphical illustration that generally indicates that the uncertainty associated with the resultant elevation angle depends on the instrument error, but also depends on the angular separation between aircraft attitudes during angle-of-arrival measurements. FIG. 12 expands on three of the curves shown in FIG. 11 (i.e., h=75°, h=45°, and h=−5°). FIG. 12 shows a band around each of the three curves that represents the effects of the AOA measurement error. Due to this AOA measurement error, the intersection of the three curves is not a clearly defined point, and as such, the solution includes a band of uncertainty in azimuth and elevation that encompasses the true azimuth and elevation.

Note that the uncertainty associated with the resultant elevation not only depends on the instrument error $\sigma\theta$, but also depends on the aircraft attitude separation between pairs of angle measurements performed at different attitudes. In the case illustrated in FIG. 12 the headings are: h=75°, h=45°, h=−5°. Once the best estimate of the elevation angle (el) is obtained, substituting its value into the azimuth determining equations (2b) provides a new estimate of the nominal azimuth that is substantially corrected from coning error contributions.

For general aircraft attitudes (i.e., not necessarily a hovering airborne platform), the case is slightly more complex. To illustrate the concept in an operational manner, the discussion will be based on numerical data around the values associated with the arbitrarily selected flight path depicted in FIG. 9. For brevity, consider four angle-of-arrival measurements arising from nominal azimuth values compatible with the first column of numbers shown in FIG. 9 (i.e., $az_1$=a(t=0), $az_2$=a(t=2), $az_3$=a(t=4), and $az_4$=a(t=7 sec)). Generic values for heading, pitch, and roll are selected so as to be compatible with the location of the interferometer (quadrant II) and the average direction of the flight path shown in FIG. 9. The set of values are, $$(5) \begin{cases} r_1 = 0, p_1 = 0, h_1 = ho = 45°, az_1 = a(0) = 90°, \alpha = 70° \\ r_2 = -10, p_2 = 15, h_2 = ho - 15°, az_2 = a(2) = 90.408°, \alpha = 70° \\ r_3 = 12, p_3 = -10, h_3 = ho + 15°, az_3 = a(4) = 90.822°, \alpha = 70° \\ r_4 = 10, p_4 = -15, h_4 = ho + 25°, az_4 = a(7) = 91.454°, \alpha = 70° \end{cases}$$

Substituting the set (5) into equations (1b) provides the set of simulated angle-of-arrival values shown below, where the relative elevation angle was assumed to be about, for example, el~16°, and needs to be determined:

$\theta = \theta(r, p, h, el, az, \alpha)$ $$(5') \begin{cases} \theta_1 = \theta(0, 0, 45, 16, 90, \alpha) = -23.969° \\ \theta_2 = \theta(-10, 15, 30, 16, 90.408, \alpha) = -6.050° \\ \theta_3 = \theta(12, -10, 60, 16, 90.822, \alpha) = -39.422° \\ \theta_4 = \theta(10, -15, 70, 16, 91.454, \alpha) = -49.342° \end{cases}$$

During the measurement time interval (e.g., $\Delta t$=7 sec.), the azimuth changes at an average rate of about daz/dt~0.207 deg/second. However, FIG. 8 shows that the elevation does not change significantly, (del/dt~0.05 deg/sec), that is, the total elevation change during measurement time $\Delta el$~0.4 degrees. Therefore, for CE correction purposes it remains essentially constant (e.g., el~16°) during the measurement time interval $\Delta t$.

Next, the above angle-of-arrival $\theta=\theta_1, \theta_2, \ldots \theta_4$, in conjunction with the corresponding aircraft attitude ($r_i$, $p_i$, $h_i$) are substituted into the azimuth determining equation (2b). Again, since the elevation angle (el) is not known, the nominal azimuth, $A(r_i, p_i, h_i, el, \theta_i, \alpha)$, corresponding to each measured $\theta_i$ is calculated for different values of the elevation angles within a plausible range of elevation values el=$el_1$, $el_2$, $el_3$, ... $el_n$. The final result of this procedure, that may be performed by computational software associated with the aircraft DF system, is graphically depicted in FIG. 13.

Figure 13:
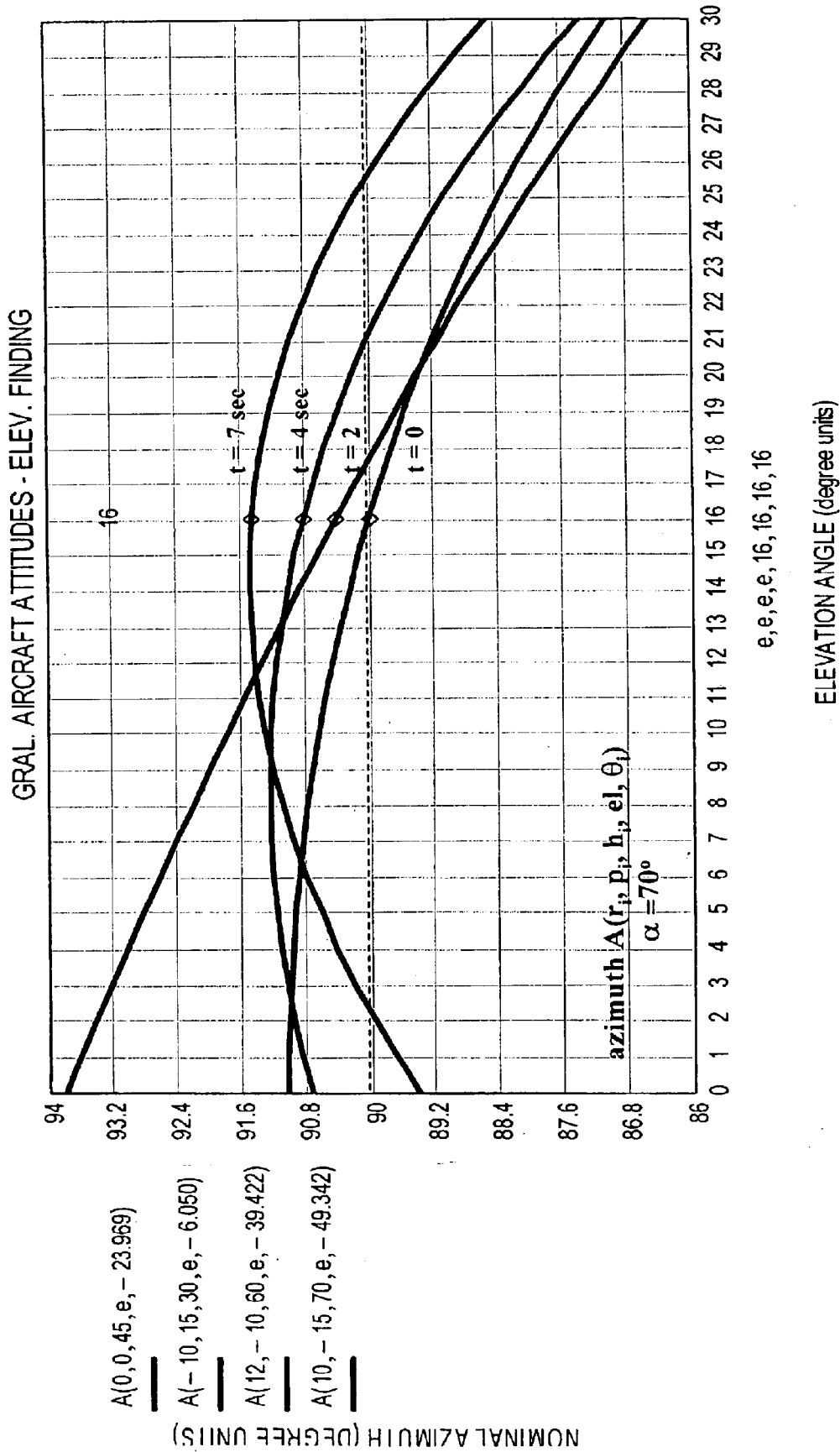
FIG. 13 is a graphical illustration of the relationship between the azimuth angle and the elevation angle of an airborne platform with respect to a radiation emitter in accordance with an exemplary embodiment of the present invention.

FIG. 13 illustrates a time-ordered, gradual increase/decrease of the azimuth value around the desired elevation angle only (resulting from motion of the airborne platform). FIG. 13 shows four curves that represent the locus of azimuth and elevation angles associated with four respective AOA readings measured at times t=0, t=2, t=4 and t=7 seconds, as the measurement aircraft flies a typical flight path past an emitter. The vertical and horizontal scales in FIG. 13 represent nominal (true) azimuth and elevation angles to the emitter at the times that each of the measurements were taken. The legend on the vertical scale indicates the aircraft attitude (roll, pitch, and heading), the elevation angle to the emitter (e) which is unknown, and the measured AOA. The first line in the legend corresponds to the curve labeled t=0, the second line corresponds to the curve labeled t=2, the third line corresponds to the curve labeled t=4 seconds, and the fourth line corresponds to the curve labeled t=7 seconds. The last four lines in the vertical legend indicate that the true azimuths at the four measurement times were 90°, 90.408°, 90.822° and 91.454° (the azimuth was changing due to the motion of the aircraft). The "e,e,e,e,16,16,16,16" legend on the horizontal scale indicates that the true elevation to the emitter was 16° at the four measurement times. In the exemplary embodiment shown in FIG. 13, it is shown that in the case of a moving aircraft, the unadjusted curves do not cross at single point that represents the true azimuth and elevation to the emitter.

As stated above, because of the aircraft motion, the azimuth changes from one measurement to the next, and the curves should not be expected to intercept around the operational elevation el~16°. Indeed, because of the motion, the azimuth curves should show a very gradual change in value at the operational elevation angle (i.e., a change such as daz~±(daz/dt) δt, where δt is the interval between measurements). FIG. 13 shows that a time-ordered, increase of azimuth values suggested by the flight path occurs only within a range of elevation values, roughly within, el~13° to 20°.

Figure 14:
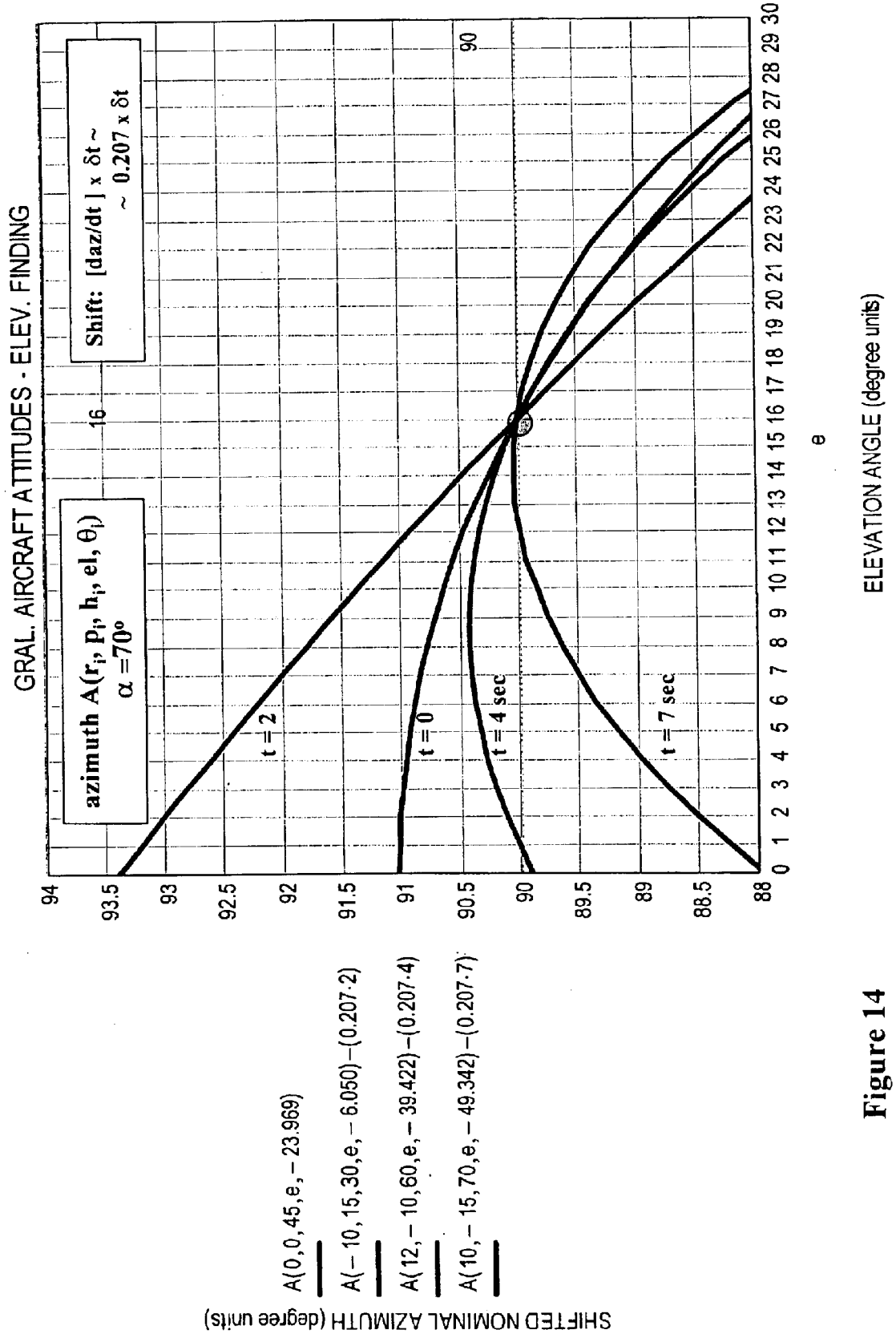
FIG. 14 is another graphical illustration of the relationship between the azimuth angle and the elevation angle of an airborne platform with respect to a radiation emitter in accordance with an exemplary embodiment of the present invention.

For illustration purposes, the azimuth curves already depicted in FIG. 13 are illustrated in FIG. 14, but the curves are shifted by an amount (daz/dt) δt~−0.207×δt, where δt is the time separation between angle measurement pairs (0, 2, 4, 7 seconds). Stated another way, FIG. 14 represents the same conditions as FIG. 13 with one exception, that the measured AOA values shown in the vertical legend for the $2^{nd}$, $3^{rd}$ and $4^{th}$ measurements include an additional term to account for the motion of the aircraft. For example, the second line includes the term "−0.207×2". This term indicates that, due to the new aircraft position at t=2, the measured value must be corrected by the azimuth rate of change (−0.207) times the number of seconds since t=0(2)= 0.207×2=0.414°. In this way, each AOA reading is referenced back to the aircraft's t=0 location. FIG. 14 illustrates that after applying the corrections for aircraft motion, the four curves intersect at the true azimuth and elevation angles.

Further inspection of FIG. 14 suggests an algorithmic procedure for the determination of the relative elevation angle between aircraft and emitter. As such, according to an exemplary embodiment of the present invention, a way to determine the relative elevation angle (el) is as follows. Consider the generic azimuth differences $$\Delta A_{ij}(el) = \{[A(r_i, p_i, h_i, el, \theta_i) - A(r_j, p_j, h_j, el, \theta_j)]/(t_i - t_j)\}, \quad (6)$$

where $t_i$ and $t_j$ are the times associated with the angle-of-arrival measurements $\theta_i$ and $\theta_j$. Note that these differences actually lead to a determination of the rate-of-change of the azimuth. Since four angle measurements were performed (n=4), then, [n!/(n−2)!×2!]=6 azimuth-rate curves are considered.

Figure 15:
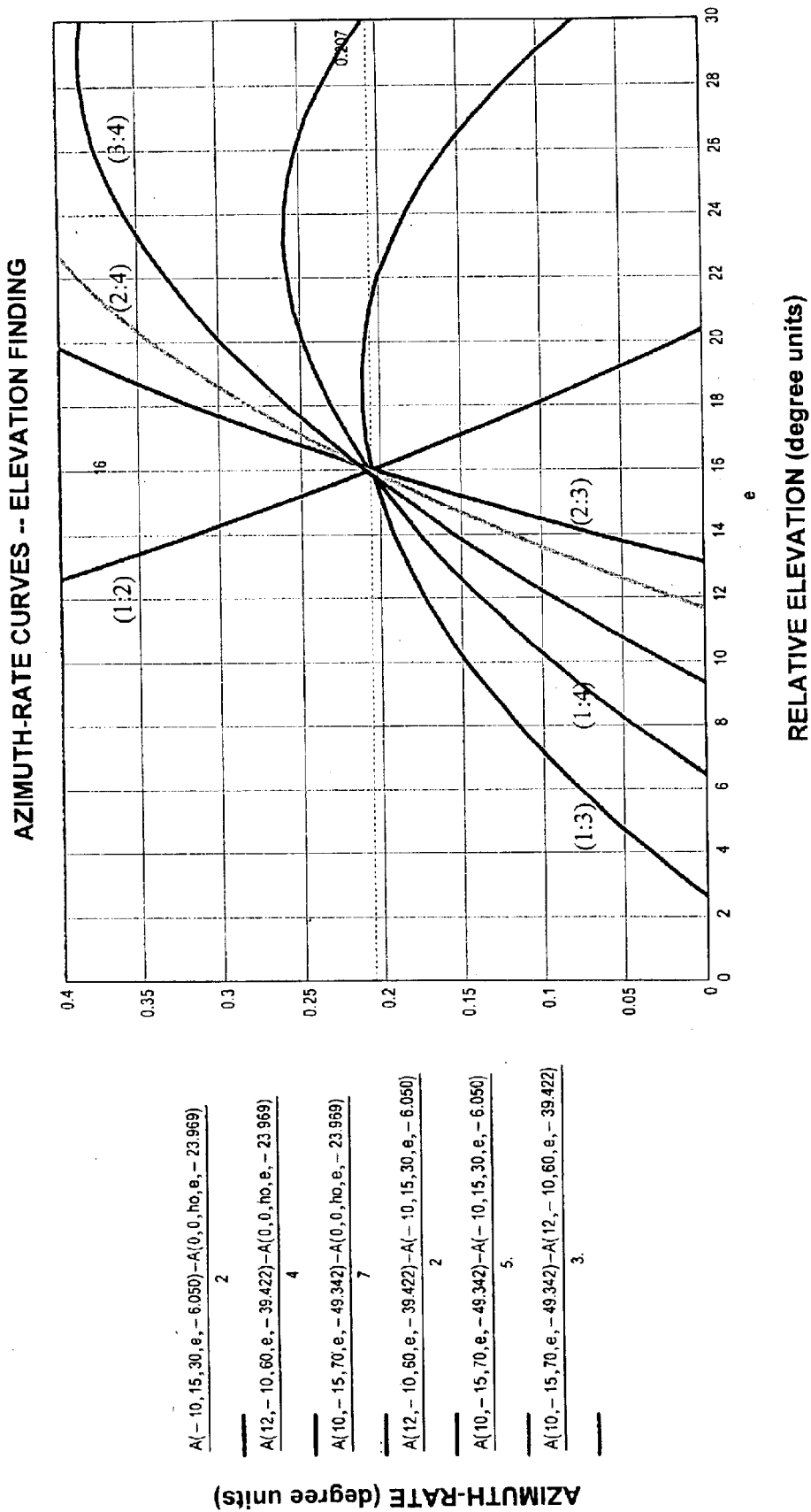
FIG. 15 is a graphical illustration of the relationship between the azimuth angle rate of change and the elevation angle of an airborne platform with respect to a radiation emitter in accordance with an exemplary embodiment of the present invention.

FIG. 15 shows that the azimuth-rate curves (6), all intercept at the correct elevation and approximate azimuth-rate value (e.g., average daz/dt~−0.207 deg/sec.). The vertical axis on FIG. 15 represents the azimuth rate of change between pairs of measurements, while the horizontal axis represents the elevation angle between the measurement aircraft and the emitter. The six mathematical expressions in the legend of the vertical axis correspond to the six combinations of measurement pairs from AOA measurements made at t=0, t=2, t=4 and t=7 seconds. The first expression (A(−10,15,30,e,−6.050)−A(0,0,ho,e,−23.969) represents the azimuth rate of change associated with measurements 1 and 2. This expression corresponds to the curve labeled "(1:2)". The second expression represents the azimuth rate of change between measurements 1 and 3, and this expression corresponds to the curve labeled "(1:3)". The third expression represents the azimuth rate of change between measurements 1 and 4, and this expression corresponds to the curve labeled "(1:4)". The fourth expression represents the azimuth rate of change between measurements 2 and 3, and this expression corresponds to the curve labeled "(2:3)". The fifth expression represents the azimuth rate of change between measurements 2 and 4, and this expression corresponds to the curve labeled "(2:4)". Lastly, the sixth expression represents the azimuth rate of change between measurements 3 and 4, and this expression corresponds to the curve labeled "(3:4)".

The crossing of the extreme pair of curves (1:2 and 1:3) will provide in practice (after measurement errors are introduced) the minimum intersection error. This pair of curves has a large aircraft attitude separation, that is curve 1:2 ⇒ (r=−10°, p=+15°, h=30°), and curve 1:3 ⇒ (r=+12°, p=−10°, h=60°).

Figure 16:
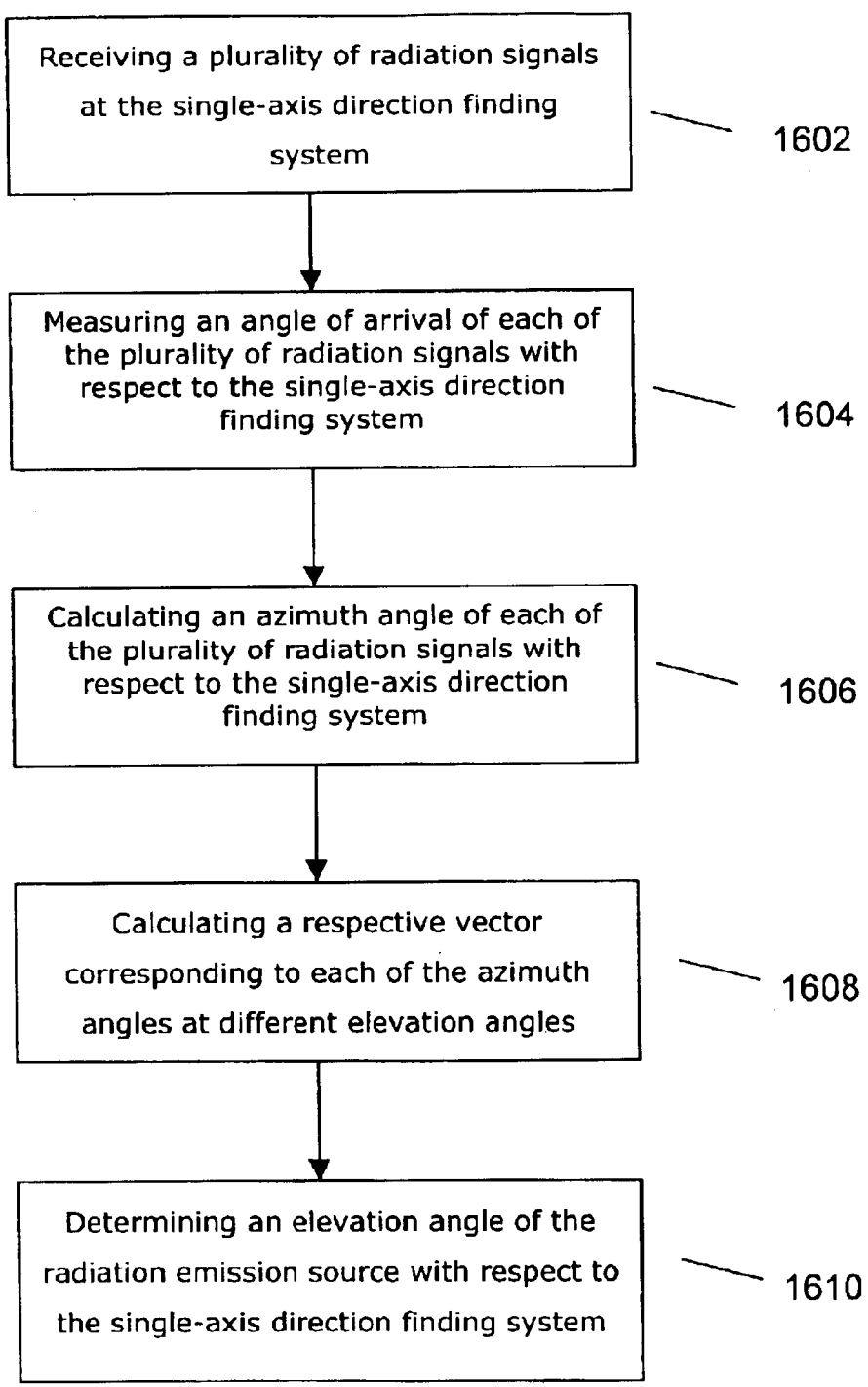
FIG. 16 is a flow diagram illustrating a method of determining the azimuth and elevation of a radiation emission source in accordance with an exemplary embodiment of the present invention.

FIG. 16 is a flow diagram illustrating a method of determining an azimuth and elevation of a radiation emission source using a single-axis direction finding system (e.g., an interferometer). At step 1602, a plurality of radiation signals are received at the single-axis direction finding system. The plurality of radiation signals are emitted from the radiation emission source. Each of the plurality of radiation signals is received at one of a plurality of attitudes of the single-axis direction finding system. At step 1604, an angle of arrival of each of the plurality of radiation signals is measured with respect to the single-axis direction finding system. At step 1606, an azimuth angle of each of the plurality of radiation signals is calculated with respect to the single-axis direction finding system using the respective measured angle of arrival. At step 1608, a respective vector corresponding to each of the azimuth angles is calculated at different elevation angles within a predetermined range. At step 1610, an elevation angle of the radiation emission source is determined by the point of convergence of the vectors.

Figure 17:
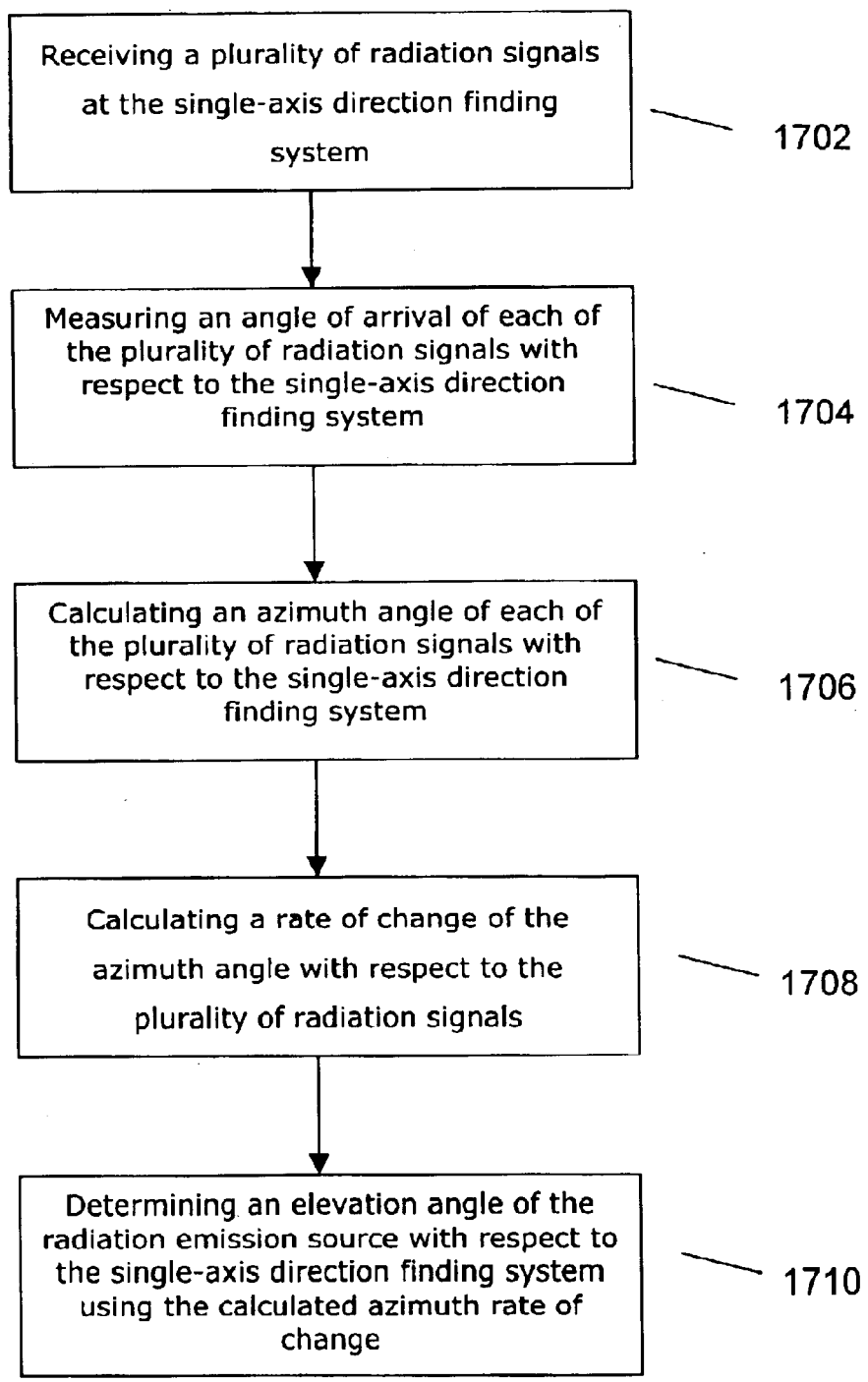
FIG. 17 is a flow diagram illustrating another method of determining the azimuth and elevation of a radiation emission source in accordance with an exemplary embodiment of the present invention.

FIG. 17 is another flow diagram illustrating a method of determining an azimuth and elevation of a radiation emission source using a single-axis direction finding system. At step 1702, a plurality of radiation signals are received at the single-axis direction finding system. The plurality of radiation signals are emitted from the radiation emission source. Each of the plurality of radiation signals is received at one of a plurality of attitudes of the single-axis direction finding system. At step 1704, an angle of arrival of each of the plurality of radiation signals is measured with respect to the single-axis direction finding system. At step 1706, an azimuth angle of each of the plurality of radiation signals is calculated with respect to the single-axis direction finding system using the respective measured angle of arrival. At step 1708, a rate of change of the azimuth angle is calculated with respect to the plurality of radiation signals. At step 1710, an elevation angle of the radiation emission source with respect to the single-axis direction finding system is determined using the calculated rate of change of the azimuth angle.

As such, the present invention provides a method for airborne, passive determination of the earth-referenced azimuth and relative elevation angle to an emitter using a single-axis AOA measurement system, in conjunction with the platform's angular attitude-orientation reported by the GPS/INS. In one or more of the exemplary embodiments of the present invention, the method includes one or more of the following steps. First, the single-axis DF system receives radiation signals from the radiation emitter. These radiation signals are received at several different aircraft attitudes (heading, pitch, and roll), that is, at different angular attitudes of the interferometer attached to the aircraft. Second, the angle-of-arrival is measured at the aircraft's frame of reference for each of the several aircraft attitudes ($r_i$, $p_i$, $h_i$), i=1, 2, 3, . . . These measurements implicitly depend on the elevation, el (to be determined). Several measurements are made during a time period in which the relative aircraft-to-emitter elevation angle does not change substantially. Third, the set of measured angles-of-arrival $\theta_i=\theta(r_i, p_i, h_i, el, az_i)$, at the unknown elevation angle, el, is used by the established mathematical algorithm to calculate a group of azimuth angles. The calculation of this group of azimuth angles is based on the known attitudes of the platform at measurement time, and a group-range of plausible elevation angle values (el=$el_1$, $el_2$, $el_3$, $el_4$ . . . $el_n$). Fourth, the group of azimuth angles constitutes a set of i-vectors Vi, and each of the i-vectors has n-components (the number of assumed elevation angles). That is, Vi={az($\theta i$, $el_1$), az($\theta i$, $el_2$), . . . , az($\theta i$, $el_n$)}. Fifth, corresponding components among the i-vectors, having the minimum angular separation allow for the determination of the desired elevation angle. Once the elevation angle is obtained, the final best estimate of the azimuth angle is determined by back-correcting for its generalized coning error (CE) admixture. Sixth, the algorithm suggests that the accuracy of the method is determined by the accuracy of the DF system used in the measurements, the angular separation of the aircraft attitudes used in the first step through the third step, the number of measurements, and to a lesser extent, by the accuracy associated with the GPS/INS system.

As such, the present concept considers a generic direction finding system (for example, a phase interferometer system) which is mounted on an aircraft (airborne platform). The measurements of the angle of arrival are performed not only at different aircraft headings, but may also be performed at generic angular attitudes (roll and pitch).

Although the present invention has been described primarily in terms of aircraft and airborne platforms, it is not limited thereto. The direction finding system can be mounted to any of a number of platforms, for example, stationary platforms on land, moving platforms on land, platforms on water, platforms in space, etc.

Although the present invention has been described primarily in terms of an interferometer, it is not limited thereto. Any type of direction finding system may be used to receive the radiation signals from the radiation emission source.

Although illustrated and described herein with reference to certain specific embodiments, the present invention is nevertheless not intended to be limited to the details shown. Rather, various modifications may be made in the details within the scope and ranges of equivalence of the claims and without departing from the spirit of the invention.

What is claimed:

1. A method of determining an azimuth and elevation of a radiation emission source using a single-axis direction finding system, the method comprising the steps of:

receiving a plurality of radiation signals at the single-axis direction finding system, the plurality of radiation signals being emitted from the radiation emission source, each of the plurality of radiation signals being received at one of a plurality of attitudes of the single-axis direction finding system;

measuring an angle of arrival of each of the plurality of radiation signals with respect to the single-axis direction finding system;

calculating an azimuth angle of each of the plurality of radiation signals with respect to the single-axis direction finding system using the respective measured angle of arrival;

calculating a plurality of azimuth rate of change vectors using the calculated azimuth angle of each of the plurality of radiation signals; and determining an elevation angle of the radiation emission source with respect to the single-axis direction finding system by determining a convergence of the vectors.

2. The method of claim 1 wherein the step of receiving a plurality of radiation signals includes receiving a plurality of radiation signals at the single-axis direction finding system, the single-axis direction finding system being connected to an airborne platform.

3. The method of claim 1 additionally comprising the step of:

at least partially correcting for a coning error in the calculated azimuth angle of the radiation emission source with respect to the single-axis direction finding system using the determined elevation angle of the radiation emission source with respect to the single-axis direction finding system.

4. The method of claim 1 wherein the step of receiving a plurality of radiation signals includes receiving at least three radiation signals at the single-axis direction finding system, the three radiation signals being emitted from the radiation source.

5. The method of claim 1 wherein the step of receiving a plurality of radiation signals includes receiving each of the plurality of radiation signals at at least one of a heading, roll, and pitch orientation of the single-axis direction finding system.

6. The method of claim 1 wherein the step of calculating an azimuth angle includes calculating an azimuth angle of each of the plurality of radiation signals with respect to the single-axis direction finding system using the respective measured angle of arrival, a respective attitude of the single-axis direction finding system, and an estimated elevation angle of the radiation emission source with respect to the single-axis direction finding system.

7. The method of claim 1 wherein the plurality of azimuth rate of change vectors are calculated using the relation $$\Delta A_{ij}(el)=\{[A(r_i, p_i, h_i, el, \theta_i)-A(r_j, p_j, h_j, el, \theta_j)]/(t_i-t_j)\},$$

where el represents a range of elevation angles, $\theta_i$ and $\theta_j$ are two of the angle of arrival measurements, $t_i$ and $t_j$ are the times associated with the angle-of-arrival measurements, $r_i$ and $r_j$ are roll aircraft attitude values, $p_i$ and $p_j$ pitch aircraft attitude values, and $h_i$ and $h_j$ are heading aircraft attitude values.

* * * * *